US012432811B2

(12) United States Patent
Yang et al.

(10) Patent No.: US 12,432,811 B2
(45) Date of Patent: Sep. 30, 2025

(54) DISCONTINUOUS RECEPTION FOR SIDELINK

(71) Applicant: QUALCOMM Incorporated, San Diego, CA (US)

(72) Inventors: Wei Yang, San Diego, CA (US); Seyedkianoush Hosseini, San Diego, CA (US); Yi Huang, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/394,293

(22) Filed: Aug. 4, 2021

(65) Prior Publication Data

US 2022/0046746 A1     Feb. 10, 2022

Related U.S. Application Data

(60) Provisional application No. 63/062,336, filed on Aug. 6, 2020.

(51) Int. Cl.
*H04W 76/28*     (2018.01)

(52) U.S. Cl.
CPC .................. *H04W 76/28* (2018.02)

(58) Field of Classification Search
CPC ............. H04W 76/28; H04W 52/0216; H04W 72/0446; H04W 8/005; H04W 76/14;
(Continued)

(56) References Cited

U.S. PATENT DOCUMENTS 10,312,939 B2   6/2019   Richardson et al.
2015/0092541 A1*   4/2015   Yang ................. H04W 28/0278
                                          370/230
(Continued)

FOREIGN PATENT DOCUMENTS

CN     108307489 A     7/2018
CN     111480391 A     7/2020
(Continued)

OTHER PUBLICATIONS

3GPP: "3rd Generation Partnership Project; Technical Specification Group Services and System Aspects; Study on Architecture Enhancements for 3GPP Support of Advanced Vehicle-to-Everything (V2X) Services; Phase 2 (Release 17)", 3GPP TR 23.776 V17.0.0 (Mar. 2021) Technical Report, 3rd Generation Partnership Project (3GPP), Mobile Competence Centre, 650, Route Des Lucioles, F-06921 Sophia-Antipolis Cedex, France, Mar. 31, 2021, pp. 1-29, URL:https://ftp.3gpp.org/Specs/archive/23_series/23.776/23776-h00.zip [retrieved on Mar. 31, 2021] Sections 5, 6 and 7.

(Continued)

*Primary Examiner* — Ayanah S George
(74) *Attorney, Agent, or Firm* — Procopio, Cory, Hargreaves & Savitch LLP/QUALCOMM Incorporated

(57) ABSTRACT

A wireless device determines a discontinuous reception (DRX) pattern for sidelink communication and performs sidelink activity within a DRX ON duration of the DRX pattern. A wireless device may transmit a sidelink discovery message including information about a DRX pattern of the first wireless device and may monitor for sidelink communication based on the DRX pattern. A second wireless device may receive a sidelink discovery message from the first wireless device including information about a DRX pattern of the first wireless device and may exchange sidelink
(Continued)

communication with the first wireless device based on the DRX pattern.

69 Claims, 18 Drawing Sheets

(58) Field of Classification Search
CPC ... H04L 5/0055; H04L 5/0053; H04L 5/0048; Y02D 30/70
See application file for complete search history.

(56) References Cited

U.S. PATENT DOCUMENTS

| | | | |
|---|---|---|---|
| 2016/0044740 | A1 | 2/2016 | Siomina et al. |
| 2021/0227604 | A1* | 7/2021 | Huang .............. H04W 72/20 |
| 2021/0227622 | A1* | 7/2021 | Kung ................ H04W 72/20 |
| 2021/0410084 | A1* | 12/2021 | Li .................... H04W 52/265 |

FOREIGN PATENT DOCUMENTS

| | | | | |
|---|---|---|---|---|
| CN | 116326175 | A | 6/2023 | |
| WO | 2017196611 | A1 | 11/2017 | |
| WO | WO-2018016882 | A1 * | 1/2018 | ........ H04W 28/0284 |
| WO | 2018028279 | A1 | 2/2018 | |
| WO | 2018064477 | A1 | 4/2018 | |
| WO | 2018195947 | A1 | 11/2018 | |
| WO | 2018227133 | A1 | 12/2018 | |
| WO | 2021029672 | A1 | 2/2021 | |

OTHER PUBLICATIONS

International Search Report and Written Opinion—PCT/US2021/044816—ISA/EPO—Nov. 3, 2021.

Qualcomm Incorporated, et al., "New Solution: QoS Aware Power Efficient PCS Communication", Draft, S2-2004714, SA WG2 Meeting #139E (e-meeting), 3rd Generation Partnership Project (3GPP), Mobile Competence Centre, 650, Route Des Lucioles, F-06921 Sophia-Antipolis Cedex, France, vol. SA WG2, No. E (e-meeting), Jun. 1, 2020-Jun. 12, 2020, Jun. 13, 2020 (Jun. 13, 2020), 3 Pages, URL:https://ftp.3gpp.org/tsg_sa/WG2_Arch/TSGS2_139e_Electronic/Docs/S2-2004714.zip, S2-2004714 was 4298r06-pCR TR23#x_NewSol_QoS_aware_power_saving.doc Sections 1., 6.

3GPP TS 23.303: "3rd Generation Partnership Project, Technical Specification Group Services and System Aspects, Proximity-Based Services (ProSe), Stage 2 (Release 16)", 3GPP, Mobile Competence Centre, 650, Route Des Lucioles, F-06921 Sophia-Antipolis Cedex, France, vol. SA WG2, No. V16.0.0, Jul. 9, 2020, 130 Pages, XP051924379, chapters 5.3.7, 4.6.4.3, 4.6.4.9, 4.6.4.10, 3.1, 4.3.1, 4.4.1.1, 4.6.4.1-4.6.4.2b, 4.6.4.11, 4.6.4.12, 5.3.2-5.3.6A.2.3, 5.5.4-5.5.9, B, Section 5.3.1.2, section 5.3.7 and section 5.3.7.1.

3GPP TS 38.214: "3rd Generation Partnership Project, Technical Specification Group Radio Access Network, NR, Physical Layer Procedures for Data (Release 16)", Jun. 30, 2020, 3rd Generation Partnership Project, Mobile Competence Centre, 650, Route Des Lucioles, F-06921 Sophia-Antipolis Cedex, France, vol. RAN WG1, No. V16.2.0, Jul. 20, 2020, 163 Pages, XP051925549, Sections 5.1.6.4-5.1.6.5, 6.2.1, 8.1.4 and 8.1.5, paragraph [5.1.4.2], [5.2.2.4]-[5.2.3].

3GPP TS 38.321: "3rd Generation Partnership Project, Technical Specification Group Radio Access Network, NR, Medium Access Control (MAC) protocol specification (Release 16)", 3GPP Standard Technical Specification, 3rd Generation Partnership Project (3GPP), Mobile Competence Centre, 650, Route Des Lucioles, F-06921 Sophia-Antipolis Cedex, France, vol. RAN WG2, No. V16.1.0, Jul. 24, 2020, 150 Pages, XP051925832, Section 5.22.1.2.

Sequans Communications: "Sidelink Maintenance for Evolved L2 Relay", 3GPP TSG-RAN WG2#98, R2-1705126, Hangzhou, China, May 15, 2017-May 19, 2017, May 19, 2017, 4 Pages, The whole Document.

* cited by examiner

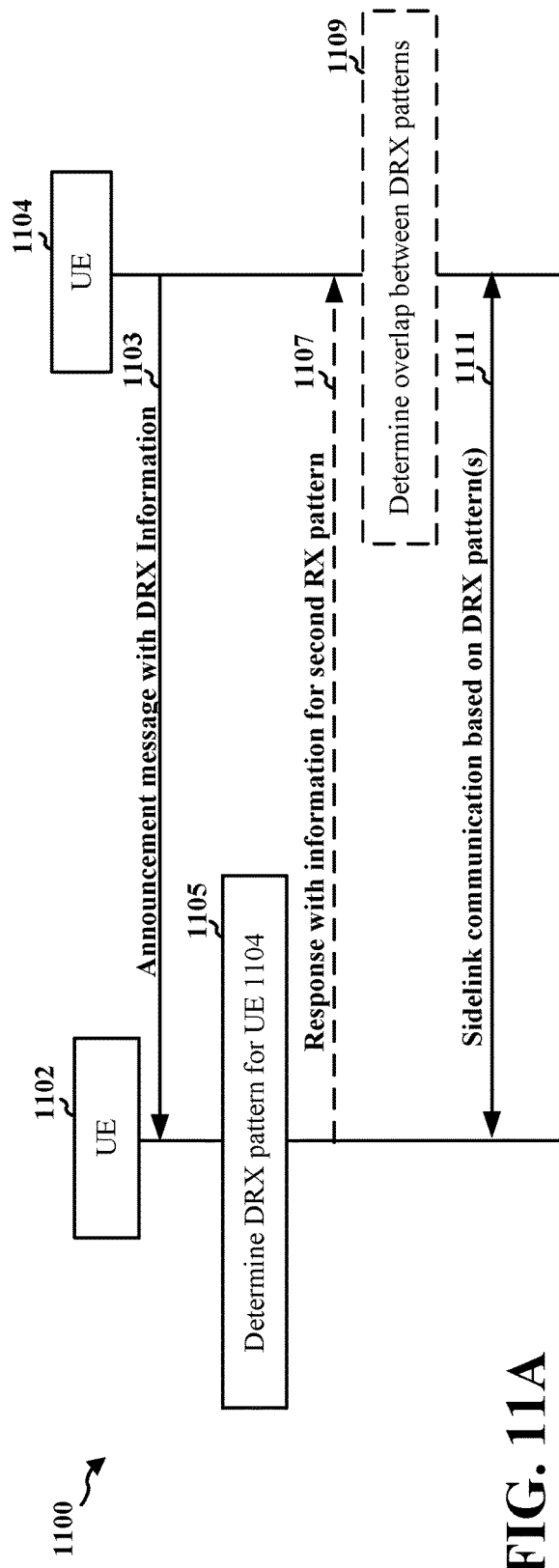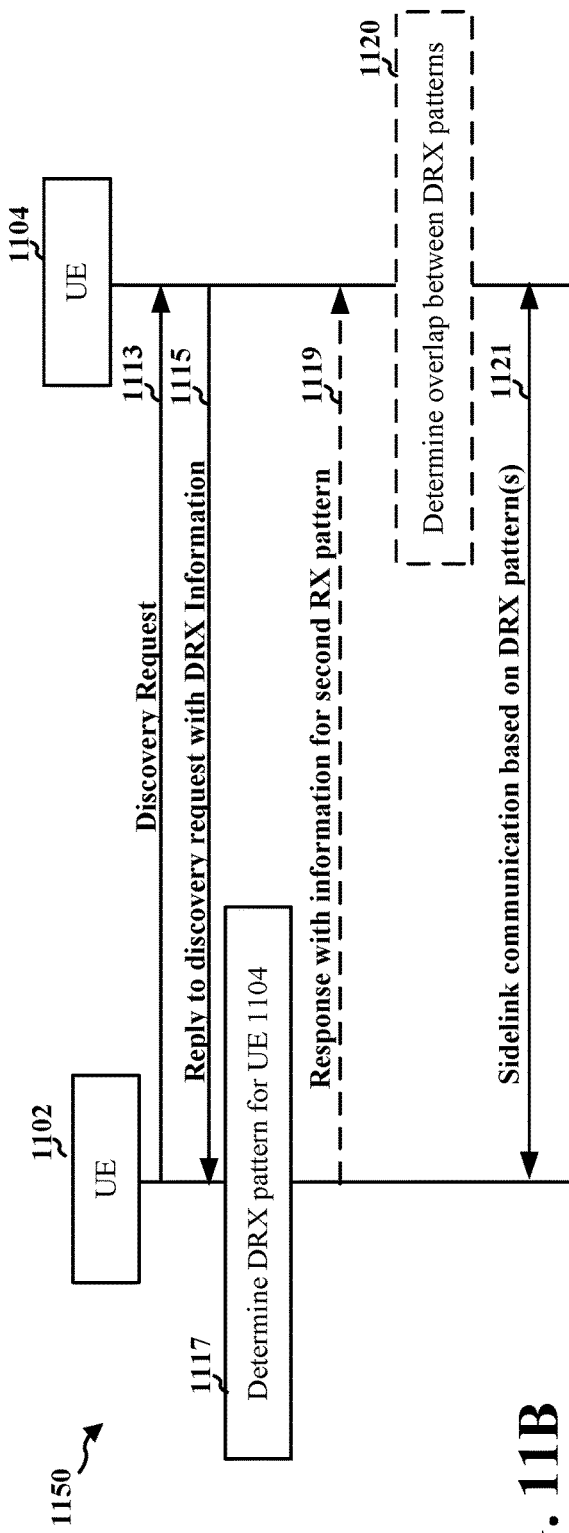
FIG. 11A
FIG. 11B

DISCONTINUOUS RECEPTION FOR SIDELINK

CROSS REFERENCE TO RELATED APPLICATION(S)

This application claims the benefit of and priority to U.S. Provisional Application Ser. No. 63/062,336, entitled "Discontinuous Reception for Sidelink" and filed on Aug. 6, 2020, which is expressly incorporated by reference herein in its entirety.

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In another aspect of the disclosure, a method of wireless communication is provided. The method may include determining a resource for sidelink communication within a DRX ON duration of a DRX pattern and communicating on the resource within the DRX ON duration of the DRX pattern.

In another aspect of the disclosure, an apparatus for wireless communication is provided. The apparatus may include means for determining a resource for sidelink communication within a DRX ON duration of a DRX pattern and means for communicating on the resource within the DRX ON duration of the DRX pattern.

In another aspect of the disclosure, an apparatus for wireless communication is provided. The apparatus may include a memory, and at least one processor coupled to the memory, the memory and at least one processor being configured to determine a resource for sidelink communication within a DRX ON duration of a DRX pattern and communicate on the resource within the DRX ON duration of the DRX pattern.

In another aspect of the disclosure, a computer-readable storage medium storing computer executable code for wireless communication at a first wireless device is provided. The computer-readable storage medium may be non-transitory, for example. The code when executed by a processor cause the processor to determine a resource for sidelink communication within a DRX ON duration of a DRX pattern and communicate on the resource within the DRX ON duration of the DRX pattern.

In an aspect of the disclosure, a method of wireless communication is provided. The method may include transmitting a sidelink discovery message including information about a first discontinuous reception (DRX) pattern of the first wireless device and monitoring for sidelink communication based on the first DRX pattern.

In another aspect of the disclosure, an apparatus for wireless communication is provided. The apparatus may include means for transmitting a sidelink discovery message including information about a first discontinuous reception (DRX) pattern of the first wireless device; and means for monitoring for sidelink communication based on the first DRX pattern.

In another aspect of the disclosure, an apparatus for wireless communication is provided. The apparatus may include a memory; and at least one processor coupled to the memory, the memory and at least one processor being configured to transmit a sidelink discovery message including information about a first DRX pattern of the first wireless device and monitor for sidelink communication based on the first DRX pattern.

In another aspect of the disclosure, a computer-readable storage medium storing computer executable code for wireless communication at a first wireless device is provided. The computer-readable storage medium may be non-transitory, for example. The code when executed by a processor cause the processor to transmit a sidelink discovery message including information about a first DRX pattern of the first wireless device and monitor for sidelink communication based on the first DRX pattern In another aspect of the disclosure, a method of wireless communication with a first wireless device at a second wireless device is provided. The method may include receiving a sidelink discovery message from the first wireless device including information about a first DRX pattern of the first wireless device; and exchanging sidelink communication with the first wireless device based on the first DRX pattern.

In another aspect of the disclosure, an apparatus for wireless communication with a first wireless device at a second wireless device is provided. The apparatus may include means for receiving a sidelink discovery message from a first wireless device including information about a first DRX pattern of the first wireless device; and means for exchanging sidelink communication with the first wireless device based on the first DRX pattern.

In another aspect of the disclosure, an apparatus for wireless communication with a first wireless device at a second wireless device is provided. The apparatus may include a memory; and at least one processor coupled to the memory, the memory and at least one processor being configured to receive a sidelink discovery message from a first wireless device including information about a first DRX pattern of the first wireless device; and exchange sidelink communication with the first wireless device based on the first DRX pattern.

In another aspect of the disclosure, a computer-readable storage medium storing computer executable code for wireless communication with a first wireless device at a second wireless device is provided. The computer-readable storage medium may be non-transitory, for example. The code when executed by a processor cause the processor to receive a sidelink discovery message from a first wireless device including information about a first DRX pattern of the first wireless device; and exchange sidelink communication with the first wireless device based on the first DRX pattern.

In another aspect of the disclosure, a method of wireless communication is provided. The method may include receiving, from a base station, a resource allocation for sidelink communication based on a mode 1 resource allocation and transmitting or receiving the sidelink communication within a DRX ON duration of a DRX configuration based on the mode 1 resource allocation.

In another aspect of the disclosure, an apparatus for wireless communication is provided. The apparatus may include means for receiving, from a base station, a resource allocation for sidelink communication based on a mode 1 resource allocation and means for transmitting or receiving the sidelink communication within a DRX ON duration of the DRX configuration based on the mode 1 resource allocation.

In another aspect of the disclosure, an apparatus for wireless communication is provided. The apparatus may include a memory; and at least one processor coupled to the memory, the memory and at least one processor being configured to receive, from a base station, a resource allocation for sidelink communication based on a mode 1 resource allocation and transmit or receive the sidelink communication within a DRX ON duration of the DRX configuration based on the mode 1 resource allocation.

In another aspect of the disclosure, a computer-readable storage medium storing computer executable code for wireless communication at a first wireless device is provided. The computer-readable storage medium may be non-transitory, for example. The code when executed by a processor cause the processor to receive, from a base station, a resource allocation for sidelink communication based on a mode 1 resource allocation and transmit or receive the sidelink communication within a DRX ON duration of the DRX configuration based on the mode 1 resource allocation.

In another aspect of the disclosure, a method of wireless communication is provided. The method may include determining a discontinuous reception pattern for sidelink communication; and performing sidelink activity within a DRX ON duration of the DRX pattern.

In another aspect of the disclosure, an apparatus for wireless communication is provided. The apparatus may include means for determining a discontinuous reception pattern for sidelink communication; and means for performing sidelink activity within a DRX ON duration of the DRX pattern.

In another aspect of the disclosure, an apparatus for wireless communication is provided. The apparatus may include a memory; and at least one processor coupled to the memory, the memory and at least one processor being configured to determine a discontinuous reception pattern for sidelink communication; and perform sidelink activity within a DRX ON duration of the DRX pattern.

In another aspect of the disclosure, a computer-readable medium storing computer executable code for wireless communication at a first wireless device is provided. The computer-readable medium may be non-transitory, for example. The code when executed by a processor cause the processor to determine a discontinuous reception pattern for sidelink communication; and perform sidelink activity within a DRX ON duration of the DRX pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 11A and 11B are example communication flows between sidelink devices including at least one device that operates using DRX.

DETAILED DESCRIPTION

Figure 1:
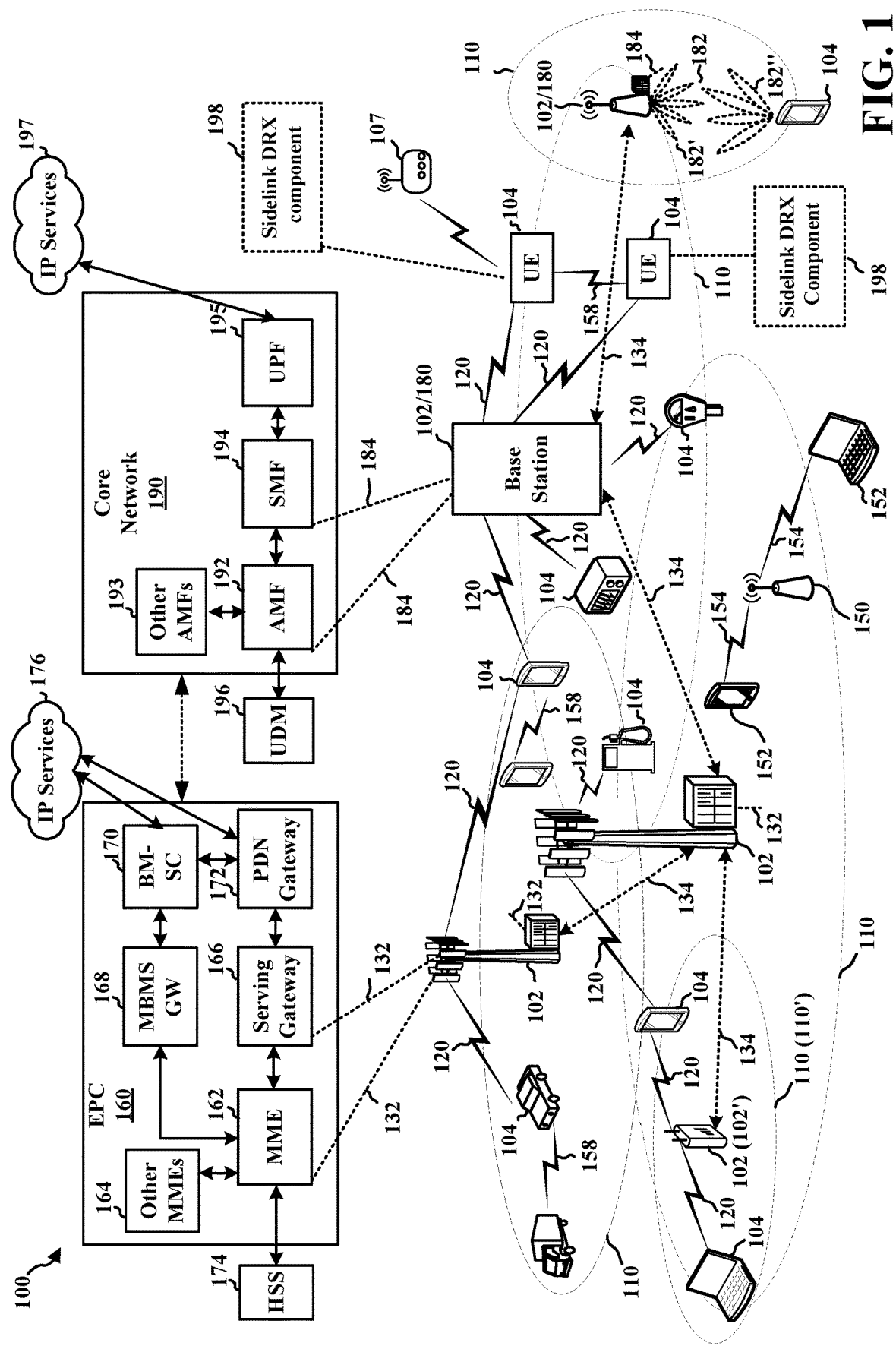
FIG. 1 is a diagram illustrating an example of a wireless communications system and an access network including devices that communicate based on sidelink.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

A UE may reduce power consumption through discontinuous reception (DRX) in which the UE monitors for communication or transmits communication during a DRX ON duration and does not monitor for communication or transmit communication during a DRX OFF duration. The DRX OFF duration may correspond to a time during which the UE operates in a lower power mode, a sleep mode, etc. In some examples, the UE may perform sensing in a discontinuous manner, which may be referred to as partial sensing. The UE may use an ON/OFF pattern in which the UE periodically performs sensing for resource allocation purposes, e.g., during a sensing period, and at other times, e.g., during a non-sensing duration of time, does not monitor for sidelink reservation signals. For example, the UE may perform sensing only during the ON period and may skip sensing during an OFF period. By having periods during which the UE does not monitor for or transmit communication, the UE may save power or extend battery life for the UE. However, sidelink communication that is exchanged directly between devices may rely on discovery messages for sidelink UEs to find nearby UEs or may rely on sensing of resource reservations by other UEs in order to select resources for transmission. A UE that is not sensing during a DRX OFF duration may miss discovery messages or resource reservations from other UEs during the DRX OFF duration. If multiple UEs operate using different DRX patterns, discovery between UEs may become more difficult.

According to one or more aspect, the UE may provide the information about the UE's DRX pattern in a broadcast announcement message and/or in a reply to a sidelink discovery message. The UE may monitor for sidelink communication based on the DRX pattern. The UE may be a first UE, and a second UE may use the DRX pattern received from the first UE to transmit communication to the first UE within the first UE's DRX ON duration. In some examples, both UEs may operate based on DRX, and the two UEs may transmit sidelink communication to each other at times that fall within the DRX ON duration for both UEs.

In some examples, the UE may perform sidelink activity, such as transmitting, receiving, sensing, or reservation of resources, within a DRX ON duration of the UE's DRX pattern, e.g., without extending the DRX ON duration. For example, the UE may postpone a retransmission that would occur outside of a DRX ON duration until the UE's next DRX ON duration. The UE may reserve resources for a sidelink transmission within a current DRX ON duration and/or in a later DRX ON duration.

Aspects presented herein provide for DRX, or partial sensing, operations by a UE for sidelink communication in a way that improves discovery of nearby sidelink devices by having a UE provide information about its DRX pattern for sidelink communication. The UE may be referred to as a DRX UE. Receiving UEs may use the information about the DRX pattern of the DRX UE to monitor for communication from the DRX UE and/or to transmit communication to the DRX UE, which improves the likelihood that the sidelink communication will be received by the DRX UE. The communication has a higher likelihood of being received by the DRX UE because the communication is transmitted at a time that the DRX UE is monitoring for communication and avoids a DRX OFF duration when the DRX UE may not be monitoring for the communication.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

A UE 104 may include a sidelink DRX component 198 configured to exchange sidelink communication with other sidelink devices. The sidelink DRX component 198 may be configured to transmit a sidelink discovery message (such as an announcement message, a connection request, or a response to a connection request) that includes information about a first DRX pattern of the UE. The sidelink DRX component 198 may be configured to monitor for sidelink communication based on the first DRX pattern. The sidelink DRX component may be configured to receive information about a second DRX pattern from another UE 104 (such as in a response to the announcement message or a response to a connection request). The sidelink DRX component 198 may be configured to communicate with the other UE 104 based on resources that are common to both DRX patterns.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
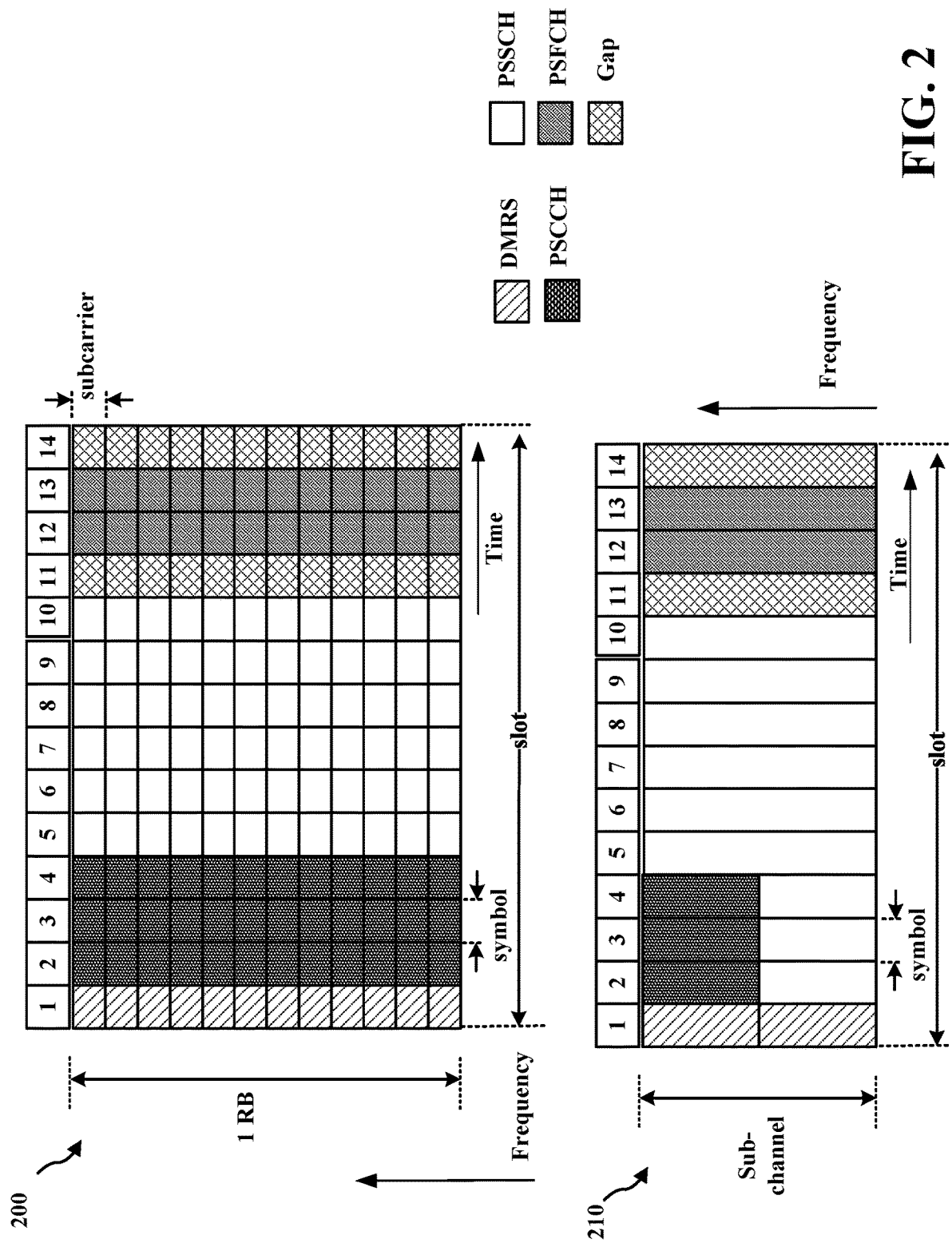
FIG. 2 illustrates aspects of an example sidelink slot structure.

FIG. 2 includes example diagrams 200 and 210 illustrating example aspects of a slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
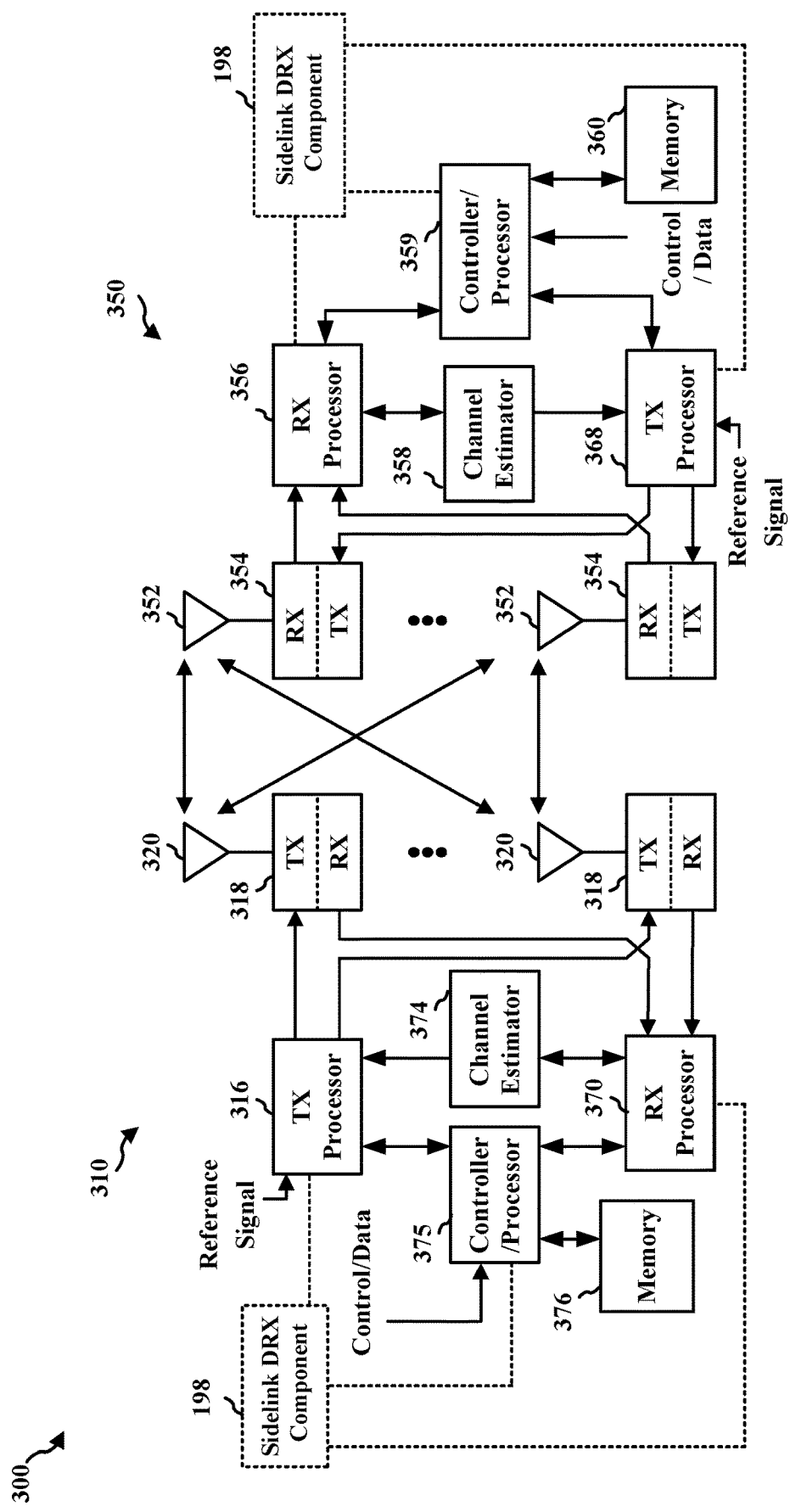
FIG. 3 is a diagram illustrating an example of a first device and a second device configured to wireless communication including sidelink communication.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, or the controller/processor 375 may be configured to perform aspects in connection with the sidelink DRX component 198 of FIG. 1. For example, the sidelink DRX component 198 may be configured to provide information about a DRX pattern for sidelink communication to the other device or may receive DRX information for sidelink from the other device. The sidelink DRX component 198 may monitor for or transmit sidelink communication based on the DRX pattern information.

Figure 4:
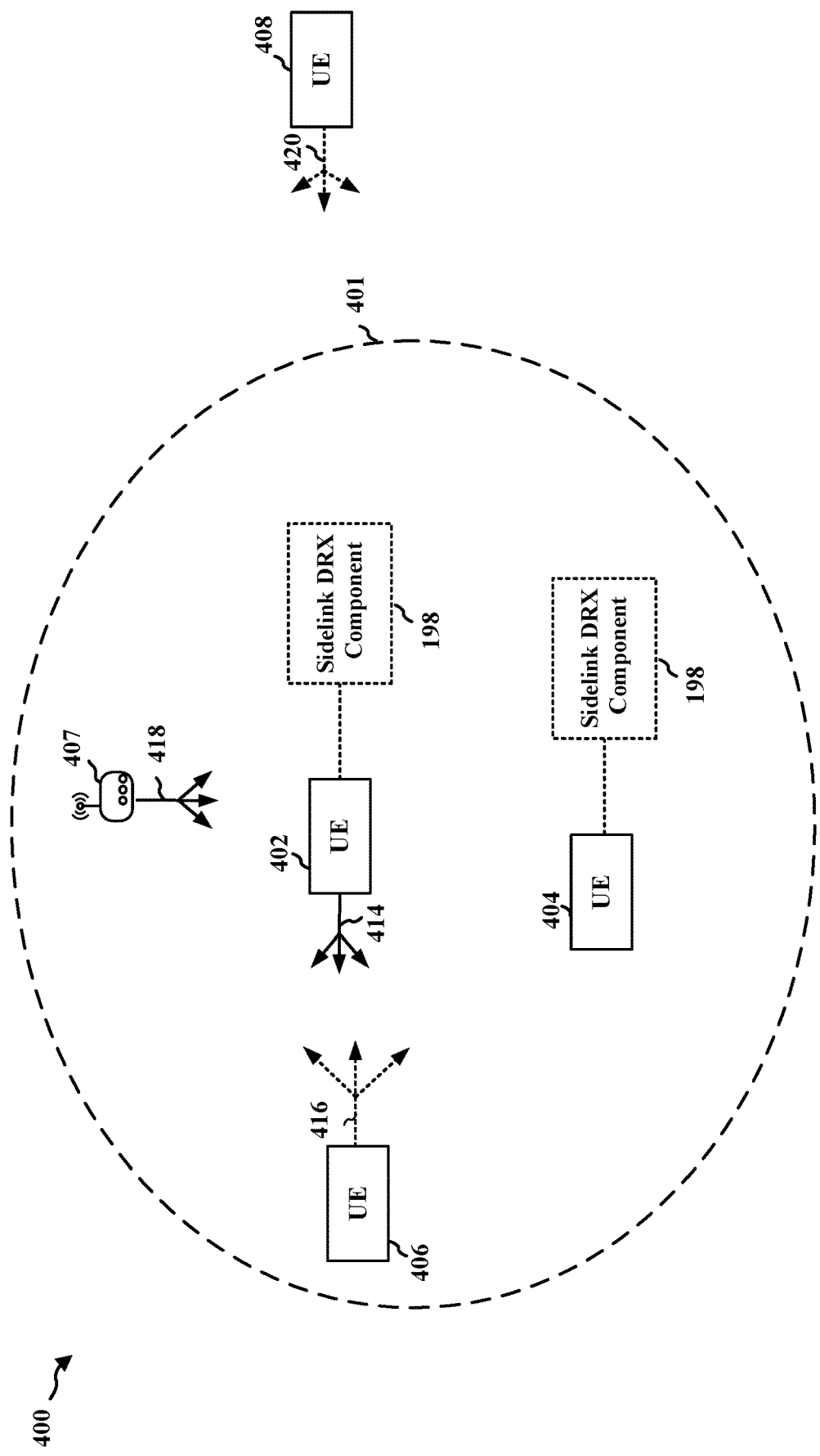
FIG. 4 illustrates an example sidelink communication system.

FIG. 4 illustrates an example 400 of wireless communication between devices based on sidelink communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 402 may transmit communication intended for receipt by other UEs within a range 401 of UE 402.

Additionally, or alternatively, the RSU 407 may receive communication from and/or transmit communication 418 to UEs 402, 404, 406, 408.

For some UEs, such as vehicle UE (VUE), the UE may have access to larger amounts of battery power, and power savings may not be as important as other factors. For example, a VUE may continually sense sidelink resources, such as a pool of resources, to identify resources reserved by other UEs whether for reception of the sidelink communication from the other UEs or for selection from the available resources for sidelink transmission. For other UEs, power savings and longer battery lives may be more significant.

As presented herein a UE 402, 404, 406, or 408 may reduce power consumption through DRX in which the UE 402, 404, 406, or 408 monitors for communication or transmits communication during a DRX ON duration and does not monitor for communication or transmit communication during a DRX OFF duration. For example, the UE may monitor for sidelink control information (SCI) discontinuously using a sleep and wake cycle. The DRX OFF duration may correspond to a time during which the UE operates in a lower power mode, a sleep mode, etc. During the DRX OFF duration, the UE may shut down, turn off, or not use a radio frequency (RF) function. The DRX pattern may include one or more timers or values, such as an ON duration timer or a value that indicates the starting point of the DRX ON duration and/or the DRX OFF duration, etc. The ON duration timer may indicate a period of time, e.g., in consecutive symbols, slots, subframes, or TTIs, in which the UE wakes up from the OFF duration and monitors for control signaling. A DRX cycle may include a periodic repetition of the DRX ON duration and the DRX OFF duration.

By having periods during which the UE does not monitor for or transmit communication, the UE may save power or extend battery life for the UE. For example, DRX for sidelink may provide power savings, e.g., at a physical layer or a medium access control (MAC) layer. Power savings may be helpful in sidelink applications such as public safety applications, commercial applications, wearables, etc.

Figure 5:
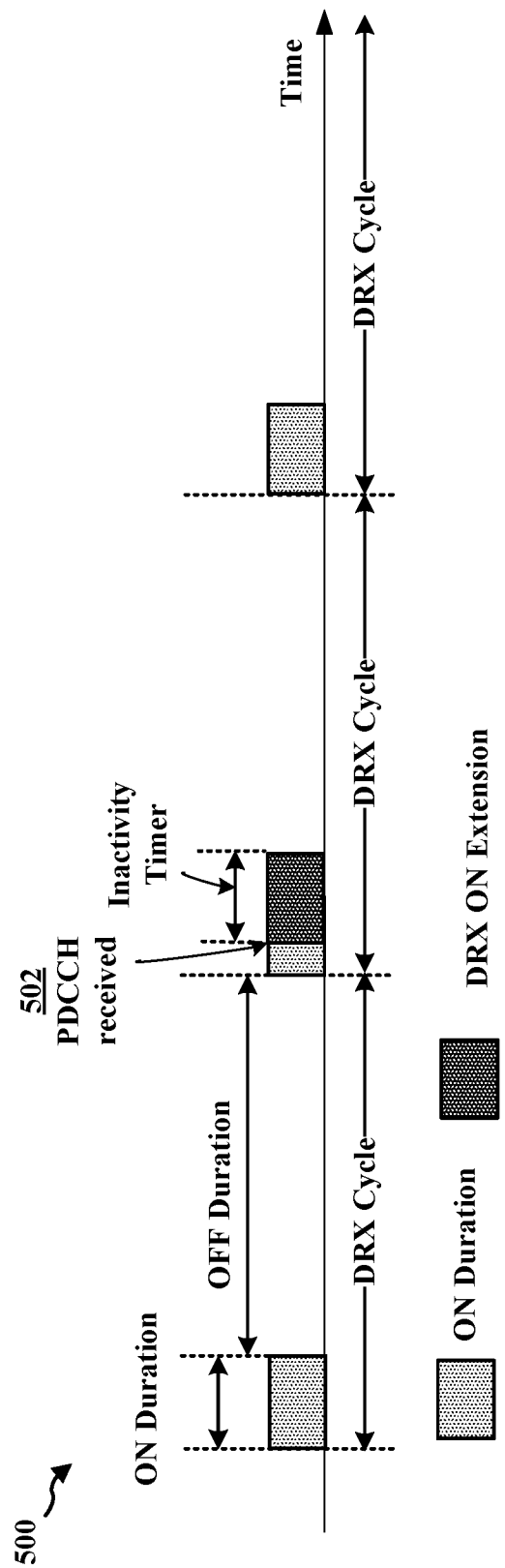
FIG. 5 illustrates an example of discontinuous reception (DRX) including an extension of a DRX ON duration.

DRX may also be used by a UE for communication over a link 120, e.g., a cellular link, access link or Uu link, between a UE 104 and a base station 102 or 180, as illustrated in FIG. 1. The base station 102 or 180 may configure the UE 104 with a DRX configuration. The base station may configure DRX parameters for the UE that indicate the DRX cycle, the DRX ON duration, etc. Additionally, the base station 102 or 180 may schedule the communication with the UE 104 based on the UE's DRX configuration because the base station is aware of the DRX configuration that the base station 102 or 180 provided to the UE 104. FIG. 5 illustrates an example of DRX cycle 500 that may be configured by a base station 102 or 180 for a UE 104 using an access link 120 with the base station. The UE 104 may monitor for PDCCH from the base station 102 or 180 during the DRX ON duration and may skip monitoring for the PDCCH during the DRX OFF duration. If the UE receives a PDCCH during the on duration, such as illustrated at 502, the UE may stay awake for an extended period of time based on an inactivity timer that starts upon reception of the PDCCH. If the UE 104 does not receive downlink communication from the base station 102 or 180 during the duration of the inactivity timer, the UE may stop monitoring, e.g., enter a sleep mode or lower power mode, for the remaining DRX OFF duration.

However, sidelink communication that is exchanged directly between devices may rely on discovery messages for sidelink UEs to find nearby UEs or may have resources selected based on sensing (e.g., reception) of resource reservations from other UEs in order to select resources for transmission. Sidelink communication may be based on different types or modes of resource allocation mechanisms. In a first resource allocation mode (which may be referred to herein as "Mode 1"), centralized resource allocation may be provided. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources.

Figure 6:
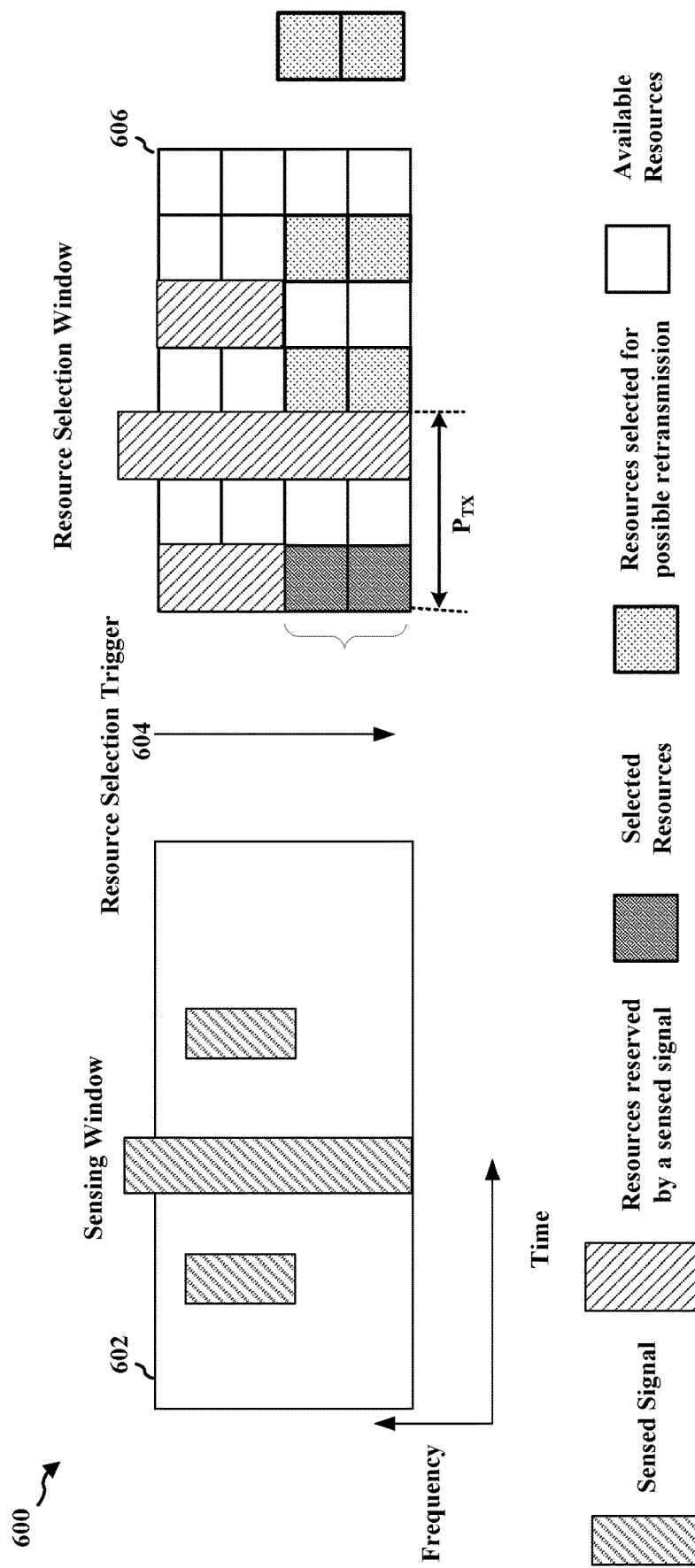
FIG. 6 illustrates example aspects of resource allocation for sidelink communication based on sensing.

FIG. 6 illustrates an example of resource allocation based on sensing 600. The UE may perform sensing by monitoring for SCI from another UE indicating resources that the other UE(s) intend to use to transmit sidelink transmissions. The SCI indicating resources may be described as reserving the sidelink resources. The SCI may include resource reservation information for the UE transmitting the SCI and/or may include reservation information that is associated with other UEs, such as in inter-UE coordination information. The indicated resources may be referred to as a sidelink reservation. The UE may monitor a set of frequency resources over a window of time, as shown at 602 in FIG. 6. The frequency range may be based on a set of resources for sidelink communication. The time and frequency resources for sidelink communication may be referred to as a resource pool. The UE may determine the available resources in the resource pool based on the remaining resources that are not reserved. In some examples, the UE may reserve resources if a measurement for the corresponding SCI that is received in the sensing window is below a threshold, such as an RSRP threshold or other signal strength threshold.

After the occurrence of a resource selection trigger, at 604, the UE may select resources for transmission from the available resources in the resource pool. The resource selection may be triggered, by the UE having data for transmission, for example. FIG. 6 illustrates an example resource pool 606, and resources selected by the UE from the available resources that are not reserved by SCI received during the sensing window.

Figure 7:
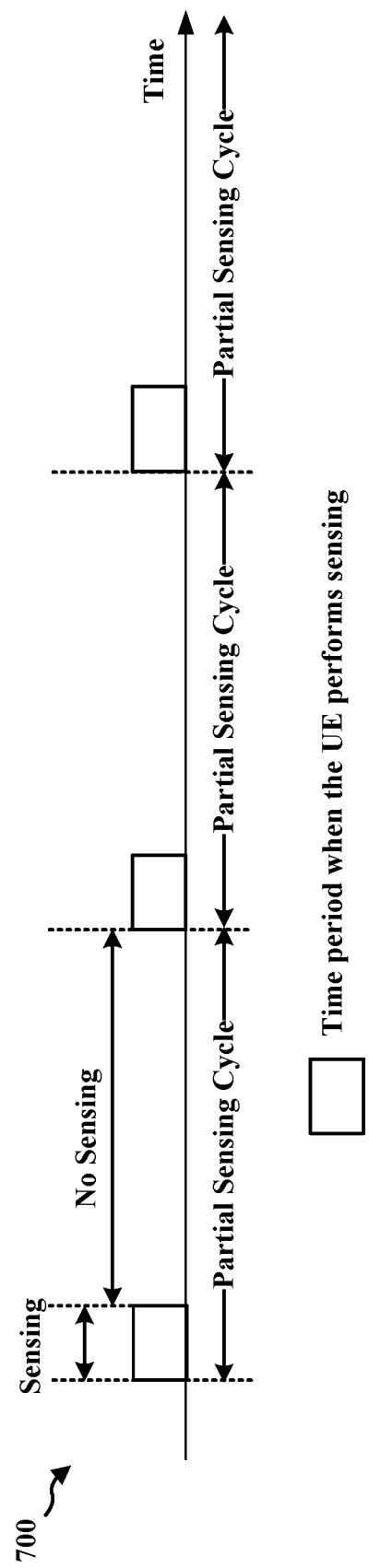
FIG. 7 illustrates example aspects of partial sensing for sidelink resource allocation.

In some examples, the UE may continually sense for reservations from other UEs. In other examples, the UE may perform sensing in a discontinuous manner, which may be referred to as partial sensing. FIG. 7 illustrates an example of partial sensing 700 in which the UE performs sensing in a discontinuous manner. The UE may use an ON/OFF pattern in which the UE periodically performs sensing for resource allocation purposes, e.g., during a sensing period, and at other times, e.g., during a non-sensing duration of time, does not monitor for sidelink reservation signals. For example, the UE may perform sensing only during the ON period and may skip sensing during an OFF period.

A UE operating using DRX for sidelink will miss SCI from other UEs reserving resources, and/or attempting to communicate with the UE, during the DRX OFF duration. DRX is an example of a way for a UE to achieve partial sensing, e.g., by sensing during a DRX ON duration and sleeping (or not sensing) during a DRX OFF duration.

In order to determine the presence of another sidelink device, a first sidelink device may transmit a discovery message. The discovery message may include an announcement message. The first UE may broadcast the announcement message indicating its presence as a sidelink device to other sidelink devices within a transmission range of the first UE. For example, the UE 402 in FIG. 4 may broadcast an announcement message that may be received by the UEs 404 and 406, and other sidelink devices such as the RSU 407, within the transmission range 401 of the UE 402. A sidelink UE, such as UE 404, that receives the announcement message may respond with a message to the first UE, e.g., UE 402. After discovery each other, the UEs 402 and 404 may exchange sidelink communication. The UE transmitting the announcement message may be referred to as the announcing UE. The UE transmitting the response may be referred to as the monitoring UE. The type of discovery involving a broadcast announcement and reply may be referred to as a first model of discovery, or "Model A" sidelink discovery.

In another type of sidelink discovery, a first UE, e.g., UE 402, may transmit a message that includes a discovery request for sidelink devices. The UE transmitting a discovery request may be referred to as a discovered UE. A UE receiving the discovery request, e.g., UE 404, may process the request and transmit a reply to the UE that transmitted the discovery request. The UE transmitting the reply may be referred to as the discoveree UE. The type of discovery including a discovery request message may be referred to as a second type of discovery or "Mode B" sidelink discovery. In Mode A, the announcement message informs other sidelink UEs "I am here," whereas the Mode B discovery request asks, or indicates, "Who is there?" or "Are you there?" to nearby sidelink devices.

Figure 8:
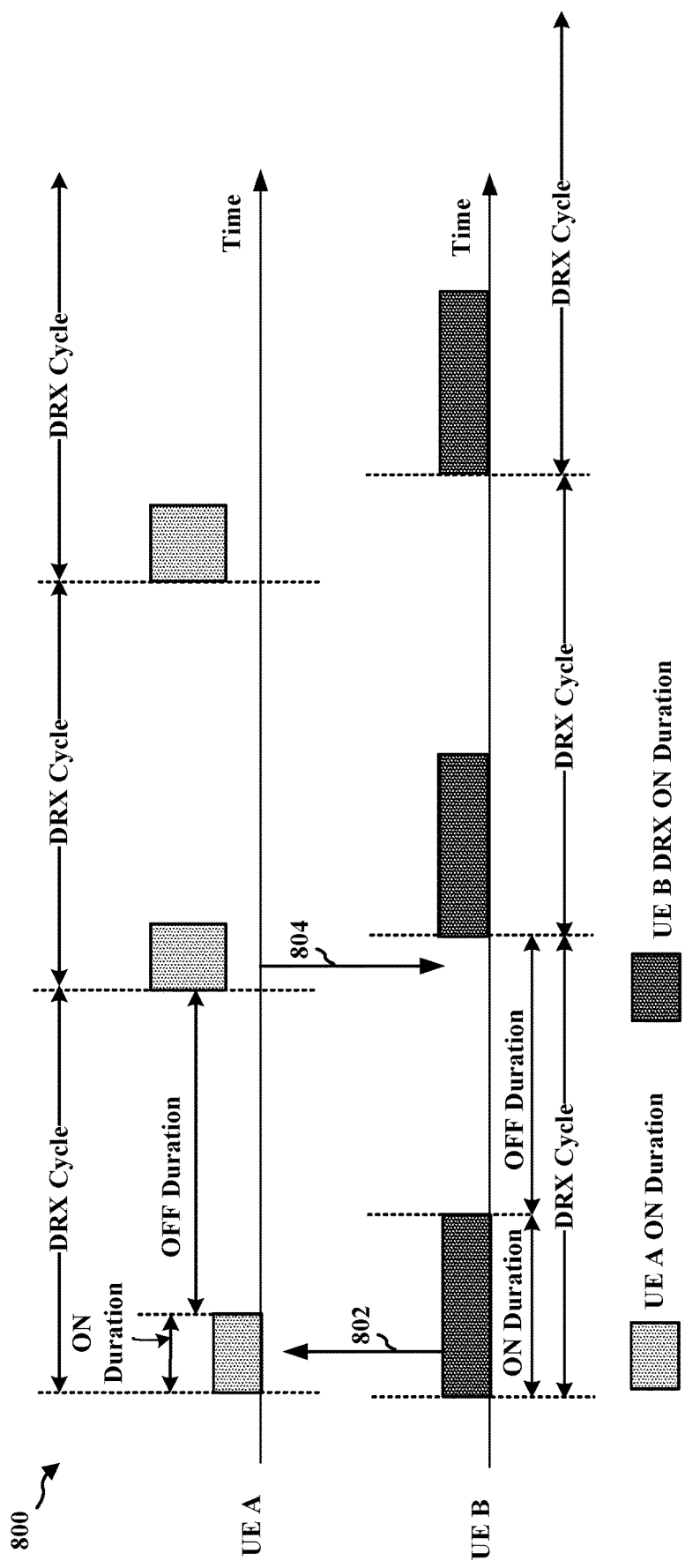
FIG. 8 illustrates examples of different DRX cycles for sidelink UEs.

A UE in a DRX OFF duration will miss messages from other UEs (e.g., discovery messages or communication messages) in addition to not sensing resource reservations. If multiple UEs operate using different DRX patterns, discovery and communication between UEs may become more difficult. In some examples, the UE may monitor or sense a discovery pool without performing DRX, e.g., each UE may monitor the discovery pool of resources. The discovery pool may include periodic time and frequency resources, e.g., that occur every 40 ms, every 100 ms, etc. Within the period, a portion of slots may be used for discovery. Each UE may monitor the slots for discovery. However, even if a first UE and a second UE discover each other during the discovery slot, the second UE may miss communication from the first UE if the communication is transmitted while the second UE is in a DRX OFF duration. FIG. 8 illustrates an example of two different DRX cycles 800 for two UEs. FIG. 8 illustrates that portions of the DRX ON duration for the two UEs may overlap in some DRX cycles and may not overlap in others. If a first UE (e.g., UE A) is performing DRX, the second UE (e.g., UE B) will not know when the first UE will be awake or asleep. UE A may receive a discovery message 802 from UE B during the first DRX cycle. If the UE A transmits a reply 804 to the UE B at the beginning of UE A's DRX ON duration during the second DRX cycle, UE B will miss the reply because it arrives before UE B's DRX ON duration.

Aspects presented herein help to enable DRX for sidelink by providing for DRX information to be exchanged between UEs and for coordination of sidelink communication based on DRX information from one or more UEs. One or more of the UEs, such as UE 402, 404, or 406 may include a sidelink DRX component 198 configured to provide information about a DRX pattern for sidelink communication to the other device or may receive DRX information for sidelink from the other device. The sidelink DRX component 198 may monitor for or transmit sidelink communication based on the DRX pattern information. Although examples are described herein for a UE, the aspects may be applied by any device communicating based on sidelink.

During the discovery procedure, UE A and/or UE B may communicate information about its respective DRX pattern as part of a discovery message. A discovery message may refer to a message exchanged during a procedure in which UE A and UE B find each other and establish a link between UE A and UE B for sidelink communication.

In an example for the Model A discovery procedure, the announcing UE may broadcast or announce its presence and may include DRX information with the announcement message. For example, in the first example 1100 in FIG. 11A, the UE 1104 may transmit an announcement message 1103 with DRX information. Thus, the announcing UE may broadcast DRX information about a DRX pattern used by the announcing UE. The monitoring UE may scan for an announcement message from another UE. The monitoring UE, e.g., UE 1102, may receive the announcement message 1103 from the announcing UE and may determine the DRX information about the announcing UE from the announcement message, at 1105.

In some examples, the monitoring UE may use the DRX information to communicate with the announcing UE, e.g. by transmitting a response to the announcement message during a DRX ON duration of the announcing UE. FIG. 11A illustrates the UE 1102 and 1104 exchanging sidelink communication 1111 based at least one the DRX pattern of the UE 1104.

Figure 9:
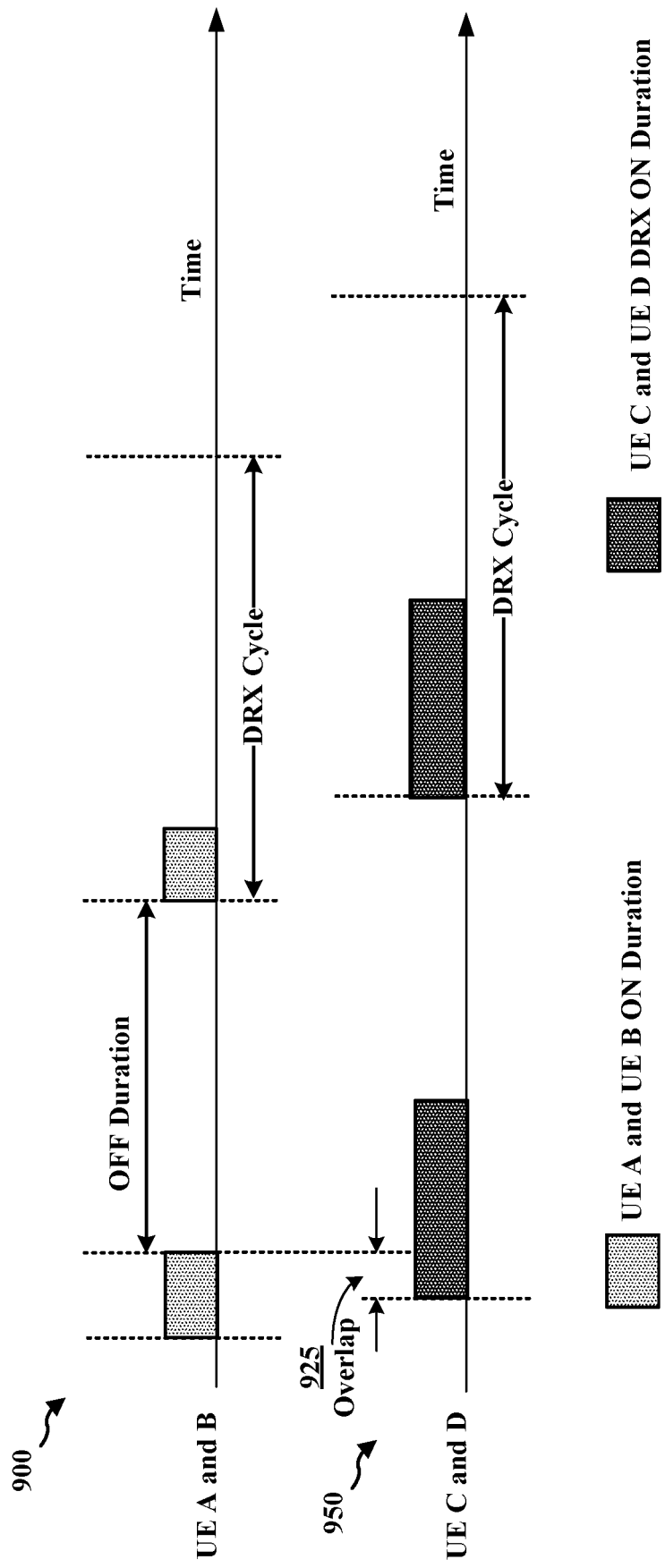
FIG. 9 illustrates an example of coordination among different DRX cycles for sidelink UEs.

In some examples, the monitoring UE may follow the same DRX pattern as the announcing UE. In other examples, the monitoring UE may select a different DRX pattern or may be using a different DRX pattern. The monitoring UE may respond to the announcement message by providing DRX information about the different DRX pattern to the announcing UE, e.g., in response 1107. The announcing UE and the monitoring UE may then exchange sidelink communication 1111 by transmitting and receiving communication within a common portion between the DRX ON durations of the two DRX patterns. For example, the UEs 1102 and 1104 may both use the DRX information for the respective UE along with the received DRX information from the other UE to determine an overlap between the DRX patterns, e.g., as illustrated at 1109. FIG. 9 illustrates a first DRX pattern 900 and a second DRX pattern 950. The UE's may use the overlap 925 between the DRX ON duration of the first DRX pattern 900 and the DRX ON duration of the second DRX pattern 950 to transmit sidelink communication to the other UE. The announcing UE and the monitoring UE may avoid using resources of their respective DRX ON duration that fall outside of the DRX ON duration of the other UE for transmitting sidelink communication to the other UE.

FIG. 11B illustrates an example 1150 for the Model B discovery procedure, the discoverer (e.g., UE 1102) may send a connection request 1113, and the discoveree (e.g., UE 1104) may send a response 1115 together with its DRX information. The discoverer may use the DRX information to determine the DRX pattern of the discoveree, at 1117. In some examples, the discoverer UE may follow the same DRX pattern as the discoveree UE. In other examples, the discoverer UE may select a different DRX pattern or may be using a different DRX pattern. The discoverer UE may respond to the reply by providing DRX information about the different DRX pattern to the discoveree UE, as illustrated at 1119. The discoveree UE and the discoverer UE may then exchange sidelink communication by transmitting and receiving communication, at 1121, within a common portion between the DRX ON durations of the two DRX patterns, e.g., as determined at 1120. FIG. 9 illustrates a first DRX pattern 900 and a second DRX pattern 950. The UE's may use the overlap 925 between the DRX ON duration of the first DRX pattern 900 and the DRX ON duration of the second DRX pattern 950 to transmit sidelink communication to the other UE. The discoveree UE and the discoverer UE may avoid using resources of their respective DRX ON duration that fall outside of the DRX ON duration of the other UE for transmitting sidelink communication to the other UE.

Figure 10:
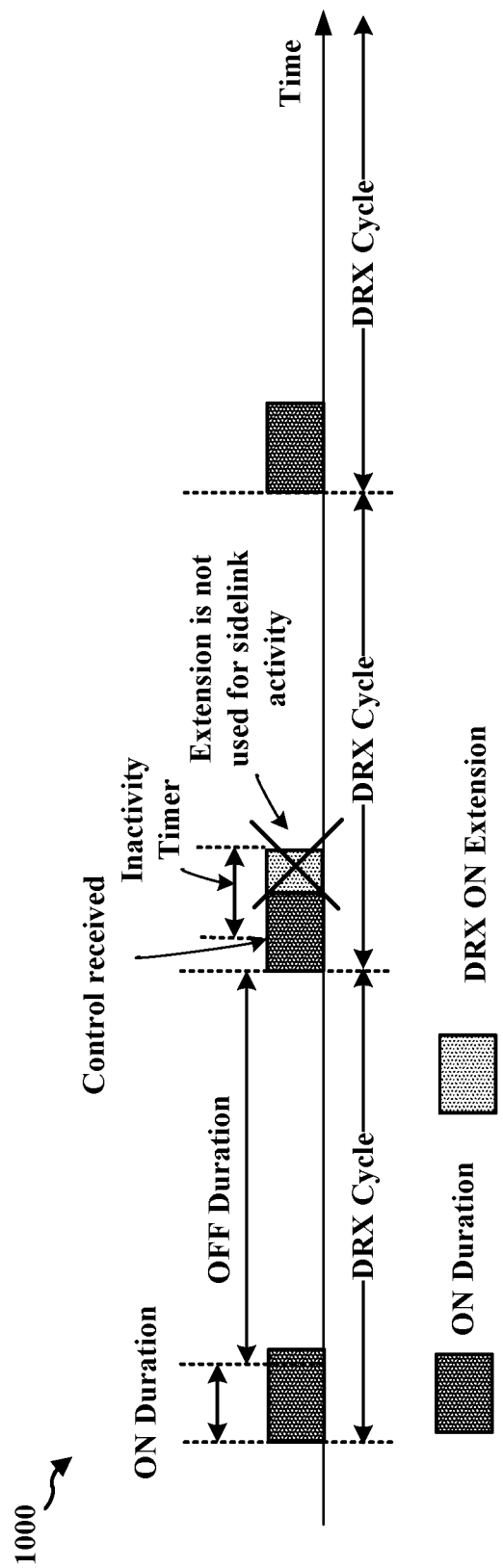
FIG. 10 illustrates an example of a restriction on extension of a DRX ON duration for sidelink activity.
Figure 16:
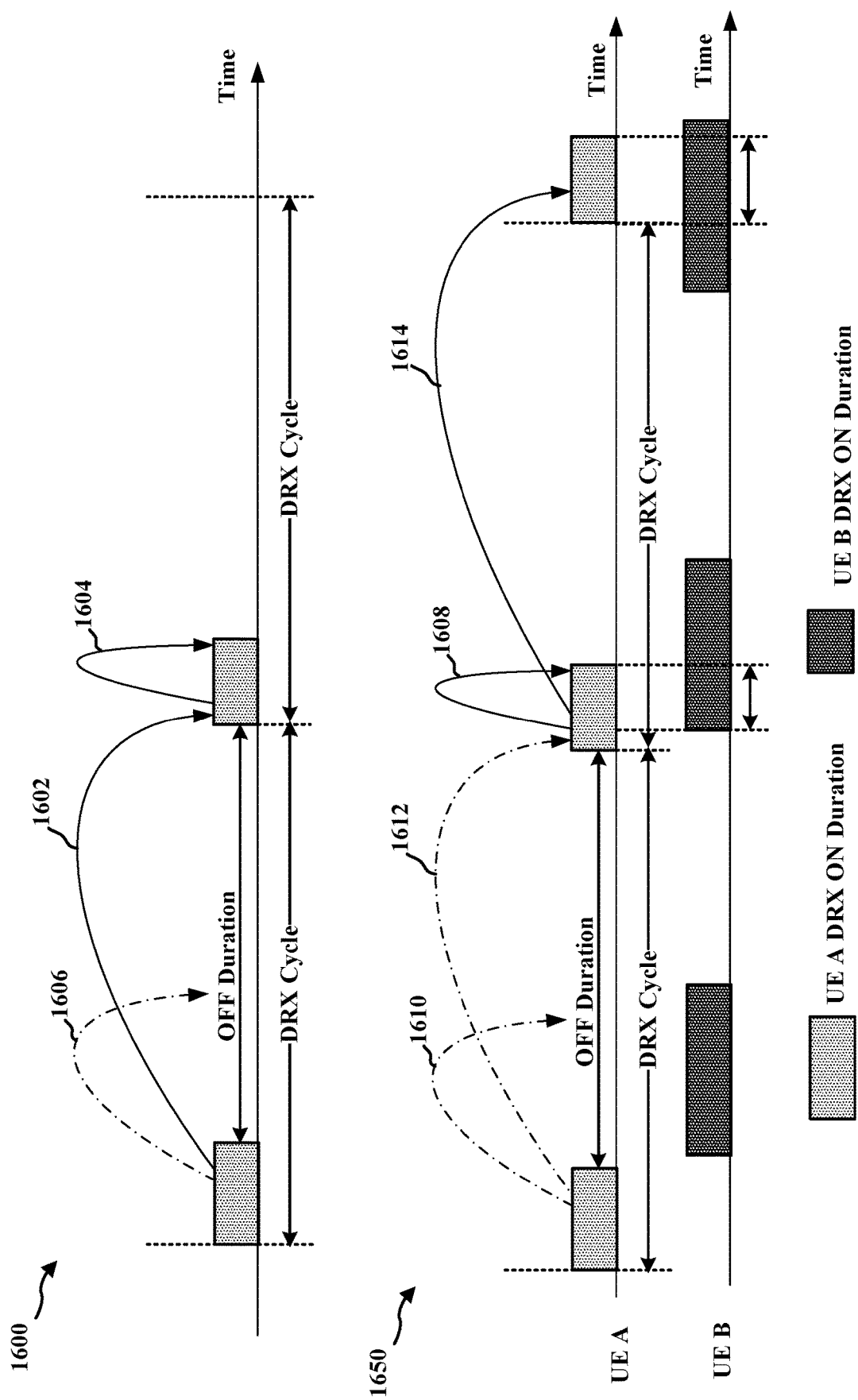
FIG. 16 illustrates an example of resource reservation based on a DRX pattern.

As described in connection with FIGS. 6 and 7, a UE using distributed resource allocation for sidelink communication may perform partial sensing and may select resources for sidelink transmission based on the partial sensing. If a sidelink UE is performing partial sensing using a sensing period and a non-sensing period, such as sensing during a DRX ON duration and not sensing during a DRX OFF duration, the UE will not have sensing information about reservations that are transmitted outside of the DRX ON duration and may not be able to use the resources for sidelink communication. In some examples, the sidelink UE may not extend the DRX ON duration for a longer duration of time for sidelink activity. For example, the UE may not expand the DRX ON duration to perform a HARQ retransmission based on receiving negative feedback or not receiving positive feedback for an initial sidelink transmission transmitted during the DRX ON duration. FIG. 10 illustrates an example DRX pattern 1000 for a sidelink UE. Whereas a UE that receives communication during a DRX ON duration configured by a base station for an access link may extend the DRX ON duration as shown for the DRX ON extension, a UE may refrain from extending the sidelink DRX ON duration. For example, the UE may refrain from using an extension of a DRX ON duration for sidelink activity such as a sidelink transmission, retransmission, sidelink reception, sidelink sensing, etc. FIG. 16 illustrates an example showing that a UE may select and reserve resources that are within a DRX ON duration. FIG. 16 illustrate an example 1600 showing a DRX pattern and a resource reservation 1602 that is transmitted in a first DRX ON duration for resources in another DRX ON duration, a resource reservation 1604 that is transmitted in a DRX ON duration and reserves resources within the same DRX ON duration. The wireless device may refrain from reserving resources outside of a DRX ON duration, such as illustrated at 1606. If the receiver UE is also performing DRX, then the selected/reserved resources may be resources that are also in the receiver UE's DRX ON duration. FIG. 16 illustrates an example 1650 in which the UE may transmit the resource reservation 1608 or 1614 reserving resources that also overlap with the receiver UE's DRX ON duration. The UE may refrain from reserving resources (e.g., 1610 and 1612) that are not within the DRX ON duration of the UE reserving the resources (e.g., UE A) or the UE receiving the transmission (e.g., UE B). The reservation may occur within the same DRX ON duration, such as for 1608, or across different DRX ON durations, such as for 1614.

For example, once a DRX pattern is configured for the UE, determined by the UE, or applied by the UE for sidelink, the UE may restrict its sidelink activity to within the configured/established DRX ON duration and may refrain from expanding the DRX ON duration. For example, the UE may refrain from expanding the DRX ON duration based on an inactivity timer and may refrain from using the extension for HARQ transmission and/or retransmission. For example, if a sidelink retransmission is needed at the end of a DRX ON duration, the UE may postpone the sidelink retransmission until the next DRX ON occasion.

The UE may restrict the sidelink activity to the DRX ON duration because the UE may not have sensing information for the DRX OFF duration.

In some examples, the sidelink UE may restrict sidelink activity to the DRX ON duration based on a type of resource allocation used by the UE. For example, the UE may restrict sidelink activity to the DRX ON duration if the UE uses a distributed resource allocation for sidelink communication in which the UE uses sensing to autonomously select resources for sidelink transmission (e.g., Mode 2 resource allocation). If the UE uses a centralized type of resource allocation in which the UE receives an allocation of resources from a base station (e.g., Mode 1 resource allocation), the UE may perform sidelink activity in an extended DRX ON duration, similar to DRX operation for a Uu link. For example, the UE may extend the DRX ON duration based on a DRX inactivity timer.

In some examples, the UE may be configured with both a sidelink and an access link (e.g., Uu link). The UE may use DRX for both sidelink communication and communication with the base station over the access link. In some examples, the UE may use a single DRX configuration for both sidelink and the access link. In other examples, the UE may use a different DRX pattern for sidelink than a DRX configuration that the UE uses with the base station. DRX may be configured separately for sidelink and the Uu link.

If the UE uses a single DRX configuration, or single DRX pattern, for both sidelink and the Uu link, the DRX ON duration may be extended, e.g., in response to reception of data on the Uu link. The UE may continue to restrict the sidelink activity to the unextended DRX ON duration, e.g., the duration that is dedicated for sidelink communication. The UE may extend the Uu communication activity with the base station, whether downlink reception or uplink transmission to an extended DRX ON period, but may restrict the sidelink activity to the unextended DRX ON duration.

If the UE uses different DRX configurations for sidelink and the Uu link, the UE may handle the extension of the DRX ON duration for the Uu link separately than the DRX ON duration for the sidelink.

In some examples, the UE may operate using DRX for sidelink based on a type of resource allocation for the sidelink communication. If the UE uses a centralized type of resource allocation in which the UE receives an allocation of resources from a base station (e.g., Mode 1 resource allocation), the UE may use DRX for sidelink using a DRX ON duration and a DRX OFF duration. If the UE uses a distributed resource allocation for sidelink communication in which the UE uses sensing to autonomously select resources for sidelink transmission (e.g., Mode 2 resource allocation), the UE may not apply DRX for sidelink communication. Instead, the UE may perform partial sensing or full sensing on a resource pool for sidelink communication. The UE may be configured, or preconfigured, to perform the partial sensing or full sensing on the resource pool. If the UE is configured to perform full sensing, the UE will not use a sleep mode and will not perform DRX. If the UE is configured to perform partial sensing according to a configured ON/OFF pattern, the partial sensing may provide power savings for the UE.

Figure 12B:
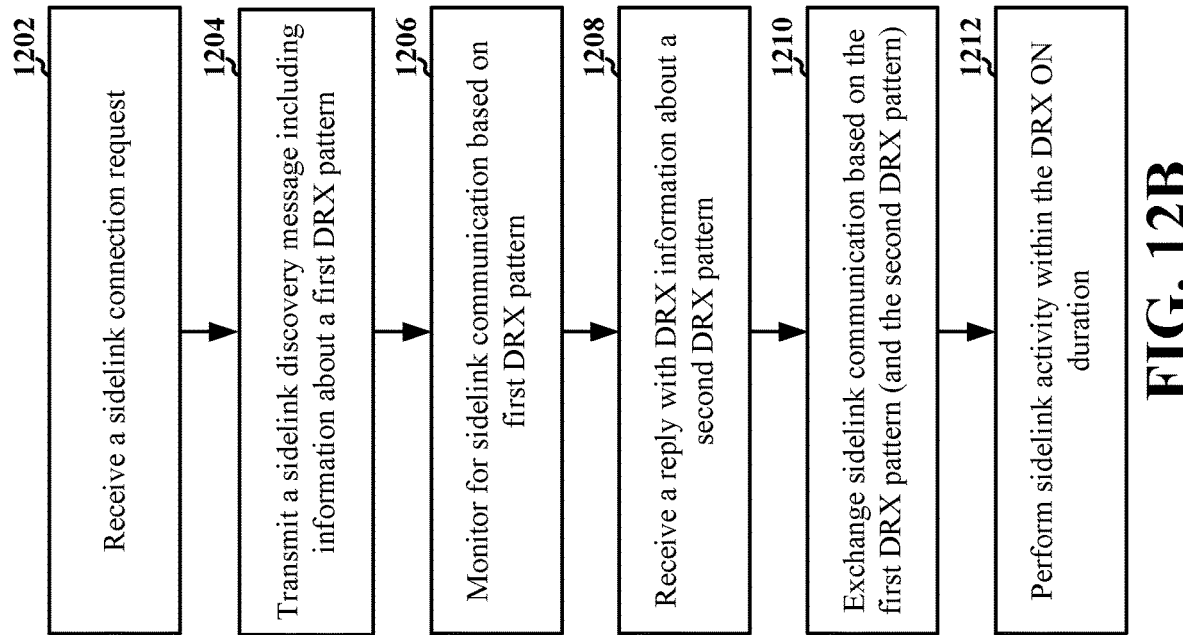
FIG. 12B is a flowchart of a method of wireless communication including DRX for sidelink.
Figure 12A:
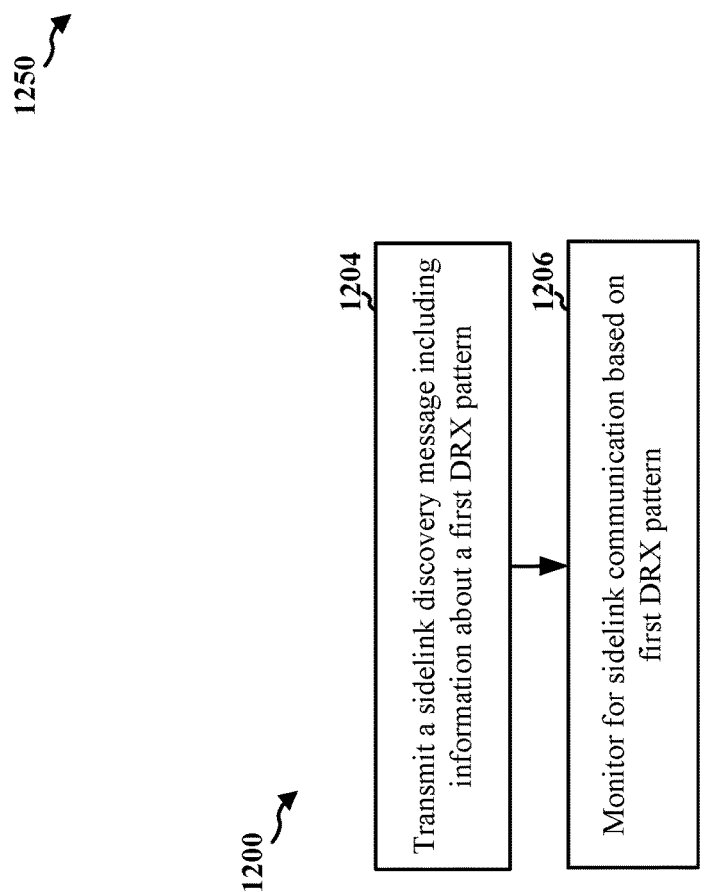
FIG. 12A is a flowchart of a method of wireless communication including DRX for sidelink.

FIG. 12A is a flowchart 1200 of a method of wireless communication. The method may be performed by a first wireless device communicating based on sidelink (e.g., the UE 104, 402, 404, 406, 408, 1104, the device 310 or 350, the RSU 407; the apparatus 1402). A method may include any combination, or subcombination, of the aspects described in connection with FIG. 12A. The method may enable a wireless device to achieve power savings through DRX in connection with sidelink communication.

At 1204, the first wireless device transmits a sidelink discovery message including information about a first DRX pattern of the first wireless device. The sidelink discovery message may comprise a sidelink announcement message, and the first wireless device may broadcast the sidelink announcement including the information about the first DRX pattern of the first wireless device, e.g., as described in connection with example 1100 in FIG. 11A. The reception may be performed by the transmission component 1434 or the discovery component 1440 of the apparatus 1402 in FIG. 14, for example.

At 1206, the first wireless device monitors for sidelink communication based on the first DRX pattern. The monitoring may be performed by the DRX component 1442 and/or the reception component 1430 of the apparatus 1402 in FIG. 14, for example.

FIG. 12B illustrates additional aspects, one or more of which may be performed in combination with 1204 and 1206 of the flowchart 1250 in FIG. 12A. A method may include any combination, or subcombination, of the aspects described in connection with FIG. 12B.

In some examples, the first wireless device may receive a sidelink connection request from the second wireless device, as illustrated at 1202, and the first wireless device may transmit the sidelink discovery message, at 1204, as response to the sidelink connection request. The reception may be performed by the reception component 1430 or the discovery component 1440 of the apparatus 1402 in FIG. 14, for example.

As illustrated at 1208, the first wireless device may receive, from the second wireless device, a reply to the discovery message, the reply including DRX information about a second DRX pattern of the second wireless device. The reply may be a reply to an announcement message, such as described in connection with 1107 in FIG. 11A. The reply (e.g., 1119) may be in response to a reply (e.g., 1115) from the first wireless device to a discovery request (e.g., 1113) from the second wireless device, such as described in connection with FIG. 11B. The reception may be performed by the reception component 1430 or the discovery component 1440 of the apparatus 1402 in FIG. 14, for example.

At 1210, the first wireless device exchanges sidelink communication with the second wireless device based on at least the first DRX pattern. The first wireless device may communicate with the second wireless device over sidelink based on resources that are common to the first DRX pattern and the second DRX pattern, such as described in connection with FIG. 9, FIG. 11A, or FIG. 11B. The communication may be performed, e.g., by the reception component 1430, the transmission component 1434, and/or the communication manager 1432 of the apparatus 1402 in FIG. 14.

As illustrated at 1212, the UE may perform sidelink activity within a DRX ON duration of the first DRX pattern. The sidelink activity may be performed, e.g., by the transmission component 1434 or the reception component 1430 in connection with the DRX component 1442. The sidelink activity performed by the first wireless device during the DRX ON duration may include one or more of sidelink transmission, sidelink reception, or sidelink sensing, where the first wireless device skips performing the sidelink activity during a DRX OFF duration of the first DRX pattern, such as described in connection with the flowchart in FIG. 15 or FIG. 17.

Figure 15:
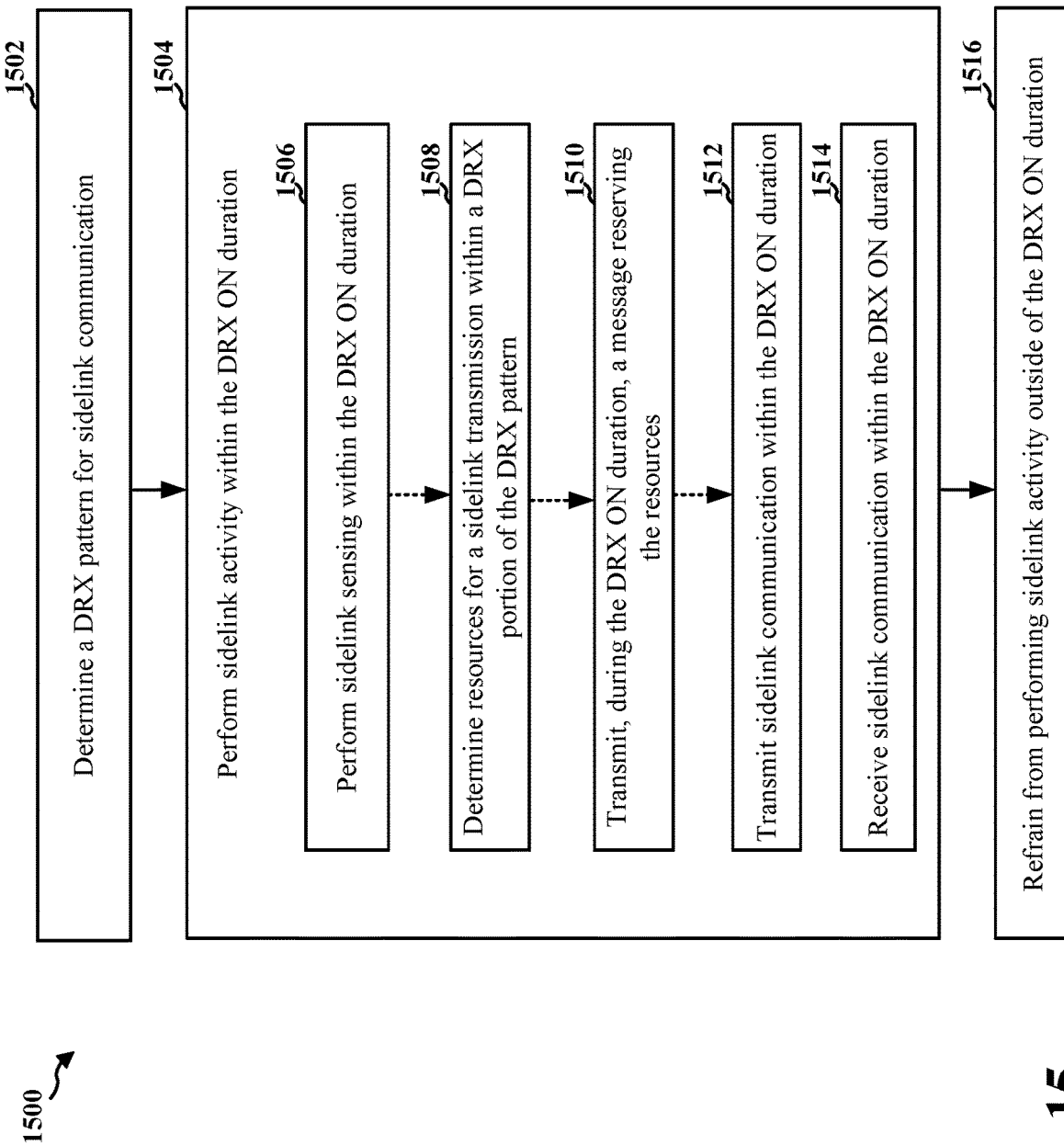
FIG. 15 is a flowchart of a method of wireless communication with a device using DRX for sidelink.

FIG. 15 is a flowchart 1500 of a method of wireless communication. The method may be performed by a first wireless device communicating based on sidelink (e.g., the UE 104, 402, 404, 406, 408, 1104, the device 310 or 350, the RSU 407; the apparatus 1402).

At 1502, the wireless device determines a DRX pattern for sidelink communication. The DRX pattern includes DRX ON durations and DRX OFF durations, such as described in connection with any of FIG. 5, 8, or 10. The determination of the DRX pattern may be performed, e.g., by the DRX component 1442 of the apparatus 1402 in FIG. 14, for example.

At 1504, the UE performs sidelink activity within a DRX ON duration of the first DRX pattern. The sidelink activity may be performed, e.g., by the transmission component 1434 or the reception component 1430 in connection with the DRX component 1442. The sidelink activity performed by the first wireless device during the DRX ON duration may include one or more of sidelink transmission, at 1512, sidelink reception, at 1514, or sidelink sensing, at 1506.

The sidelink activity performed by the first wireless device during the DRX ON duration, at 1504, may include determining resources (within a DRX ON portion) for a sidelink transmission to a second wireless device, at 1508. The determined resource may be within a DRX ON portion of the DRX. The resources reserved in the message may be inside a same DRX ON duration in which the first wireless device transmits the message, such as illustrated at 1604. The resources reserved in the message may be inside a next DRX ON duration, such as illustrated at 1602. FIG. 16 illustrate an example 1600 showing a DRX pattern and a resource reservation 1602 that is transmitted in a first DRX ON duration for resources in another DRX ON duration, a resource reservation 1604 that is transmitted in a DRX ON duration and reserves resources within the same DRX ON duration. The wireless device may refrain from sending sidelink resource reservations that reserve resources outside of a DRX ON duration, such as illustrated at 1606. The wireless device may select or reserve the resources based on the resources being within a first DRX ON duration of the first wireless device and a second DRX ON duration of the second wireless device, such as described in connection with the example 1650 in FIG. 16.

The wireless device may then transmit, during the DRX ON duration, a message to the second wireless device reserving the resources within a DRX ON duration, as illustrated at 1510. The wireless device may refrain from reserving resources outside of the DRX ON duration. The wireless device may refrain from sending the message reserving the resources outside the DRX ON duration, e.g., as illustrated at 1516.

The first wireless device may skip performing the sidelink activity during a DRX OFF duration of the first DRX pattern, as illustrated at 1516.

The first wireless device may perform the sidelink activity within the DRX ON duration without expanding the DRX ON duration, such as described in connection with FIG. 10. The first wireless device may perform the sidelink activity within the DRX ON duration without expanding the DRX ON duration based on a type of resource allocation for the sidelink communication. The first wireless device may perform the sidelink activity within the DRX ON duration without expanding the DRX ON duration if the first wireless device operates based on a mode 2 sidelink resource allocation, and the first wireless device may expand the DRX ON duration based on a DRX inactivity timer if the first wireless device operates based on a mode 1 sidelink resource allocation from a base station.

In some examples, the UE may postpone a retransmission until a next DRX ON duration if the retransmission would extend beyond the DRX ON duration. The first wireless device may receive, from a base station, a DRX configuration for an access link, where the first DRX pattern for sidelink is the same as a second DRX pattern for the access link; and may extend the DRX ON duration for the access link and using a non-extended DRX ON duration for the sidelink.

The first wireless device may receive, from a base station, a DRX configuration for an access link, where the first DRX pattern for sidelink is different than a second DRX pattern for the access link; and may extend an ON duration of the second DRX pattern for the access link.

In some examples, the first wireless device may apply a DRX configuration based on a resource allocation mode of the first wireless device. For example, the first wireless device may apply the DRX configuration for a mode 1 resource allocation from a base station for the sidelink communication. For example, the first wireless device may not apply the DRX configuration for a full sensing mode or a partial sensing mode.

Figures 13A, 13B:
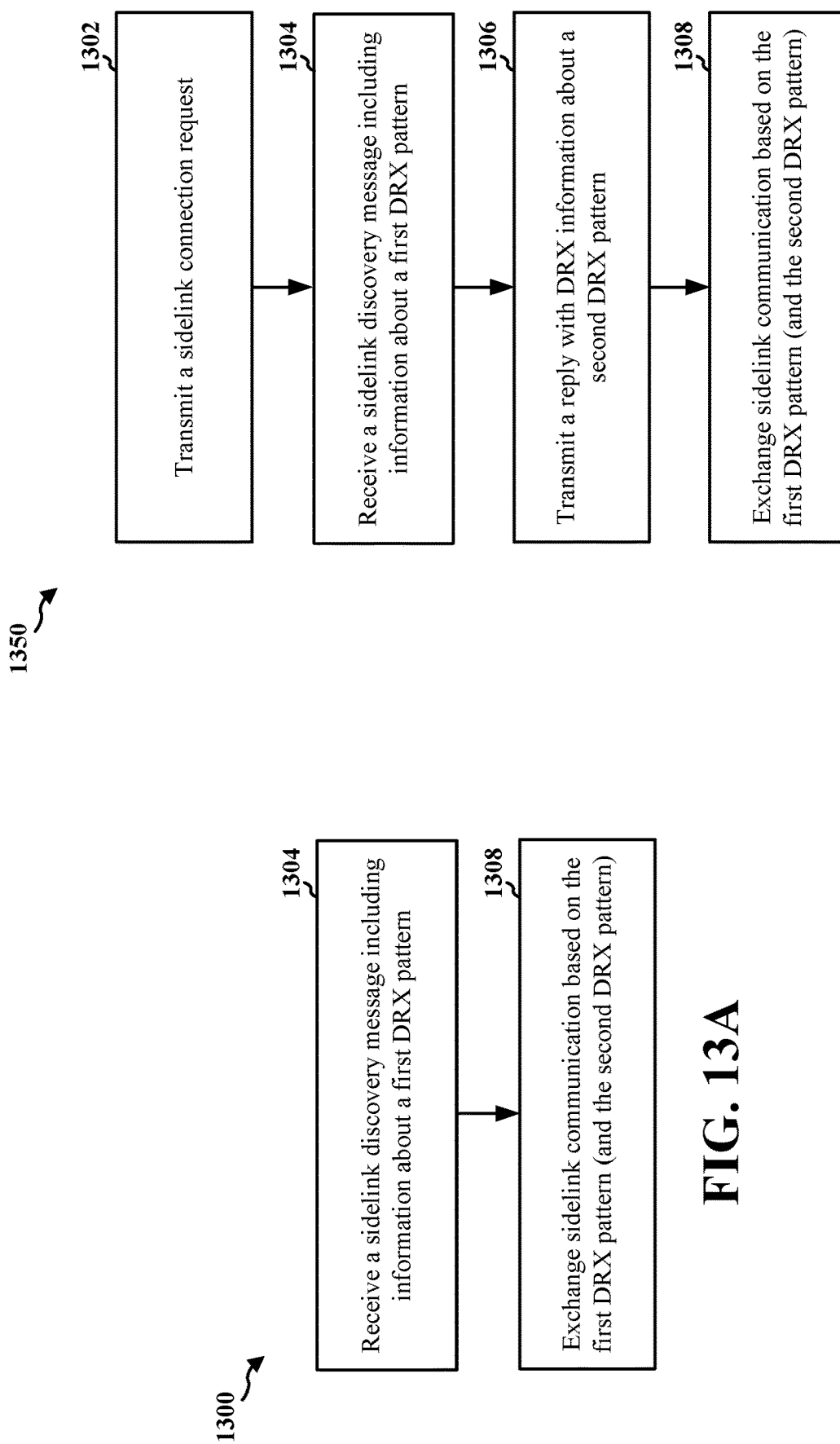
FIG. 13A is a flowchart of a method of wireless communication with a device using DRX for sidelink.
FIG. 13B is a flowchart of a method of wireless communication with a device using DRX for sidelink.

FIG. 13A illustrates a flowchart 1300 for a method of wireless communication with a first wireless device at a second wireless device. The method may be performed by the second wireless device communicating based on sidelink (e.g., the UE 104, 402, 404, 406, 408, 1102, the device 310 or 350, the RSU 407; the apparatus 1402).

At 1304, the second wireless device receives a sidelink discovery message from a first wireless device including information about a first discontinuous reception (DRX) pattern of the first wireless device. In some aspects, the first wireless device may correspond to the first wireless device described in connection with FIG. 12A or 12B. FIG. 8 and FIG. 9 illustrate examples of DRX patterns for sidelink. The sidelink discovery message may comprise a broadcast sidelink announcement message, such as described in connection with the example 1100 in FIG. 11A. The reception may be performed by the reception component 1430 or the discovery component 1440 of the apparatus 1402 in FIG. 14, for example.

At 1308, the second wireless device exchanges sidelink communication with the first wireless device based on the first DRX pattern. The second wireless device may communicate with the first wireless device over sidelink based on resources that are common to the first DRX pattern and the second DRX pattern, such as described in connection with FIG. 9 or FIG. 11A. The communication may be performed, e.g., by the reception component 1430, the transmission component 1434, and/or the communication manager 1432 of the apparatus 1402 in FIG. 14.

FIG. 13B illustrates additional aspects, one or more of which may be performed in combination with 1304 and 1308 of FIG. 13B. A method may include any combination, or subcombination, of the aspects described in connection with the flowchart 1350 in FIG. 13B. In some examples, the second wireless device may transmit a sidelink connection request to the first wireless device, as illustrated at 1302, where the second wireless device receives the sidelink discovery message, at 1304, as response to the sidelink connection request. The transmission may be performed by the transmission component 1434 or the discovery component 1440 of the apparatus 1402 in FIG. 14, for example.

As illustrated at 1306, the second wireless device may transmit a reply to the message from the first wireless device, the reply including DRX information about a second DRX pattern of the second wireless device. The reply may be a reply to an announcement message, such as described in connection with 1107 in FIG. 11A. The reply (e.g., 1119) may be in response to a reply (e.g., 1115) from the first wireless device to a discovery request (e.g., 1113) from the second wireless device, such as described in connection with FIG. 11B. The transmission may be performed by the transmission component 1434 or the DRX component 1442 of the apparatus 1402 in FIG. 14, for example.

Figure 14:
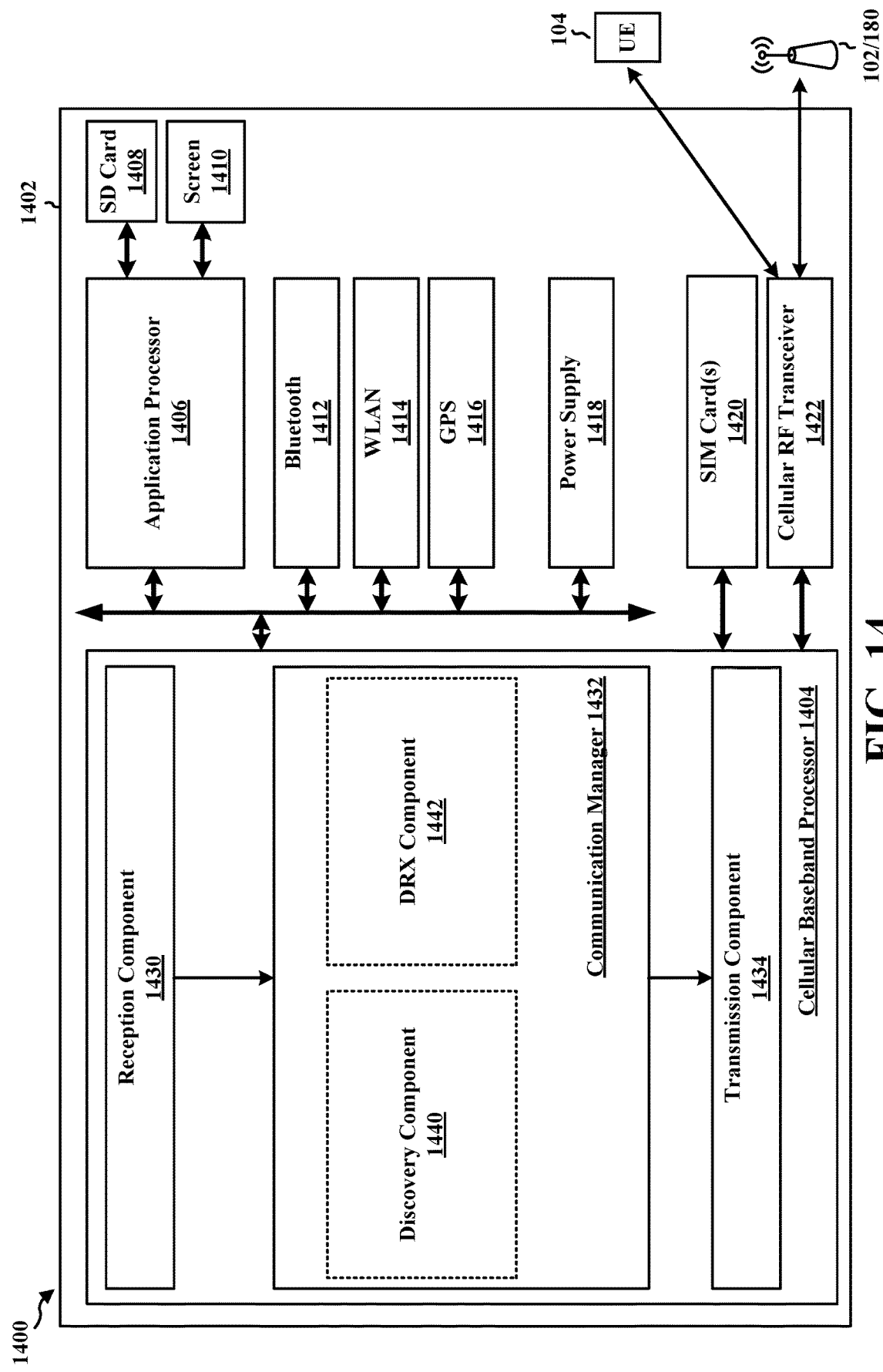
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a baseband processor 1404 (also referred to as a modem) coupled to a RF transceiver 1422. The apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The baseband processor 1404 communicates through the RF transceiver 1422 with the UE 104 and/or base station 102/180. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described supra. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a discovery component 1440 that is configured to perform discovery, e.g., as described in connection with any of FIG. 11A-13B, 17, or 18, and a DRX component 1442 that is configured to perform DRX for sidelink, e.g., as described in connection with any of FIG. 11A-13B, 17, 18A, or 18B.

The apparatus may include additional components that perform each of the blocks of the algorithm in the flowcharts of FIG. 11A-13B, 17, 18A, or 18B. As such, each block in the flowcharts of FIG. 11A-13B, 17, 18A, or 18B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband processor 1404, may include means for transmitting a sidelink discovery message including information about a first DRX pattern of the first wireless device; and means for monitoring for sidelink communication based on the first DRX pattern (e.g., reception component 1430, transmission component 1434, communication manager 1432, discovery component 1440, DRX component 1442, and/or RF transceiver 1422). The apparatus 1402 may further include means for receiving a reply to the sidelink announcement message from a second wireless device, the reply including DRX information about a second DRX pattern of the second wireless device (e.g., reception component 1430, transmission component 1434, communication manager 1432, discovery component 1440, DRX component 1442, and/or RF transceiver 1422). The apparatus 1402 may further include means for communicating with the second wireless device over sidelink based on resources that are common to the first DRX pattern and the second DRX pattern (e.g., reception component 1430, transmission component 1434, communication manager 1432, DRX component 1442, and/or RF transceiver 1422). The apparatus 1402 may further include means for receiving a sidelink connection request from a second wireless device, wherein the first wireless device transmits the sidelink discovery message as response to the sidelink connection request from the second wireless device (e.g., reception component 1430, transmission component 1434, communication manager 1432, discovery component 1440, and/or RF transceiver 1422). The apparatus 1402 may further include means for receiving a reply to the sidelink discovery message from a second wireless device, the reply including DRX information about a second DRX pattern of the second wireless device (e.g., reception component 1430, transmission component 1434, communication manager 1432, discovery component 1440, DRX component 1442, and/or RF transceiver 1422). The apparatus 1402 may further include means for communicating with the second wireless device over sidelink based on resources that are common to the first DRX pattern and the second DRX pattern (e.g., reception component 1430, transmission component 1434, communication manager 1432, DRX component 1442, and/or RF transceiver 1422). The apparatus 1402 may further include means for performing sidelink activity within a DRX ON duration of the first DRX pattern (e.g., reception component 1430, transmission component 1434, communication manager 1432, DRX component 1442, and/or RF transceiver 1422). The apparatus 1402 may further include means for postponing a retransmission until a next DRX ON duration if the retransmission would extend beyond the DRX ON duration (e.g., transmission component 1434, communication manager 1432, or DRX component 1442). The apparatus 1402 may further include means for receiving, from a base station, a DRX configuration for an access link, wherein the first DRX pattern for sidelink is the same as a second DRX pattern for the access link; and means for extending the DRX ON duration for the access link and using a non-extended DRX ON duration for the sidelink (e.g., reception component 1430 or DRX component 1442). The apparatus 1402 may further include means for receiving, from a base station, a DRX configuration for an access link, wherein the first DRX pattern for sidelink is different than a second DRX pattern for the access link; and means for extending an ON duration of the second DRX pattern for the access link (e.g., reception component 1430 or DRX component 1442). The apparatus 1402 may include means for receiving a sidelink discovery message from a second wireless device including information about a first DRX pattern of the second wireless device (e.g., transmission component 1434, communication manager 1432, discovery component 1440, DRX component 1442, and/or RF transceiver 1422); and means for exchanging sidelink communication with the second wireless device based on the first DRX pattern (e.g., reception component 1430, transmission component 1434, communication manager 1432, DRX component 1442, and/or RF transceiver 1422). The apparatus 1402 may further include means for transmitting a reply to the sidelink announcement message from the second wireless device, the reply including DRX information about a second DRX pattern of the first wireless device (e.g., transmission component 1434, communication manager 1432, discovery component 1440, DRX component 1442, and/or RF transceiver 1422). The apparatus 1402 may further include means for communicating with the second wireless device over sidelink based on resources that are common to the first DRX pattern and the second DRX pattern (e.g., reception component 1430, transmission component 1434, communication manager 1432, DRX component 1442, and/or RF transceiver 1422). The apparatus 1402 may further include means for transmitting a sidelink connection request to the second wireless device, wherein the first wireless device receives the sidelink discovery message as response to the sidelink connection request (e.g., transmission component 1434, communication manager 1432, discovery component 1440, and/or RF transceiver 1422). The apparatus 1402 may further include means for transmitting a reply to the sidelink discovery message, the reply including DRX information about a second DRX pattern of the first wireless device (e.g., transmission component 1434, communication manager 1432, discovery component 1440, and/or RF transceiver 1422). The apparatus 1402 may further include means for communicating with the second wireless device over sidelink based on resources that are common to the first DRX pattern and the second DRX pattern (e.g., reception component 1430, transmission component 1434, communication manager 1432, DRX component 1442, and/or RF transceiver 1422). The apparatus 1402 may include means for determining a DRX pattern for sidelink communication (e.g., the DRX component 1442) and means for performing a sidelink activity in a DRX ON duration of the DRX pattern (e.g., the reception component 1430, the transmission component 1434, and/or the DRX component 1442). The apparatus 1402 may include means for determining a resource for sidelink communication within a DRX ON duration of a DRX pattern and means for communicating on the resource within the DRX ON duration of the DRX pattern. The apparatus 1402 may include means for receiving, from a base station, a resource allocation for sidelink communication based on a mode 1 resource allocation (e.g., the reception component 1430 and/or the RF transceiver 1422) and means for transmitting or receiving the sidelink communication based on the DRX configuration (e.g., the e.g., the reception component 1430, the transmission component 1434, and/or the DRX component 1442). The apparatus 1402 may include means for applying a DRX configuration for sidelink communication based on a resource allocation mode of the first wireless device. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
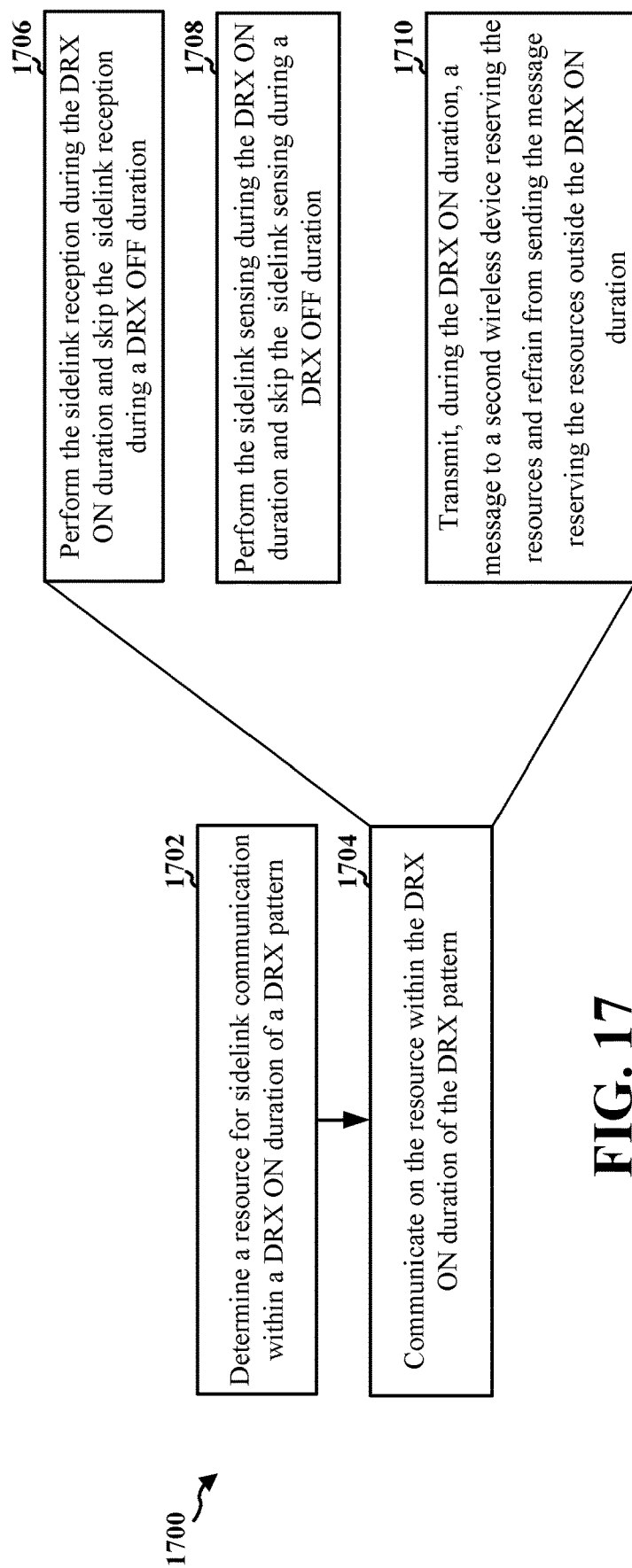
FIG. 17 is a flowchart of a method of wireless communication with a device using DRX for sidelink.

FIG. 17 is a flowchart 1700 of a method of wireless communication. The method may be performed by a first wireless device communicating based on sidelink (e.g., the UE 104, 402, 404, 406, 408, 1104, the device 310 or 350, the RSU 407; the apparatus 1402). A method may include any combination, or subcombination, of the aspects described in connection with FIG. 17. The method may enable a wireless device to achieve power savings through DRX in connection with sidelink communication.

At 1702, the wireless device determines a resource for sidelink communication within a DRX ON duration of a DRX pattern for sidelink communication. The DRX pattern includes DRX ON durations and DRX OFF durations, such as described in connection with any of FIG. 5, 8, or 10. The determination of the DRX pattern may be performed, e.g., by the DRX component 1442 of the apparatus 1402 in FIG. 14, for example.

At 1704, the UE communicates on the resource within a DRX ON duration of the first DRX pattern. The communication may be performed, e.g., by the transmission component 1434 or the reception component 1430 in connection with the DRX component 1442. The communication may include transmission and/or reception, in some aspects. The sidelink activity performed by the first wireless device during the DRX ON duration may include one or more of sidelink transmission, at 1510, sidelink reception, at 1514, or sidelink sensing, at 1506.

The communication include performing one or more of sidelink transmission, sidelink reception, or sidelink sensing during the DRX ON duration and to skip performing the one or more of the sidelink transmission, the sidelink reception, or the sidelink sensing during a DRX OFF duration of the DRX pattern. For example, as illustrated at 1706, the UE may perform the sidelink reception during the DRX ON duration and skip the sidelink reception during a DRX OFF duration. As another example, as illustrated at 1708, the UE may perform the sidelink sensing during the DRX ON duration and skip the sidelink sensing during a DRX OFF duration. As another example, as illustrated at 1710, the UE may transmit, during the DRX ON duration, a message to a second wireless device reserving the resource that occurs during the DRX ON duration and refrain from reserving resources outside the DRX ON duration.

The UE may transmit the message inside a same DRX ON duration in which the resource is reserved, such as illustrated at 1604. The UE may transmit the message in a prior DRX ON duration than the DRX ON duration in which the resource is reserved, such as illustrated at 1602. FIG. 16 illustrate an example 1600 showing a DRX pattern and a resource reservation 1602 that is transmitted in a first DRX ON duration for resources in another DRX ON duration, a resource reservation 1604 that is transmitted in a DRX ON duration and reserves a resource within the same DRX ON duration. The wireless device may refrain from sending sidelink resource reservations that reserve resources outside of a DRX ON duration, such as illustrated at 1606. The wireless device may select or reserve the resource based on the resource being within a first DRX ON duration of the first wireless device and a second DRX ON duration of the second wireless device, such as described in connection with the example 1650 in FIG. 16.

The first wireless device may skip performing the sidelink activity during a DRX OFF duration of the first DRX pattern.

The first wireless device may perform the sidelink activity within the DRX ON duration without expanding the DRX ON duration, such as described in connection with FIG. 10. The first wireless device may perform the sidelink activity within the DRX ON duration without expanding the DRX ON duration based on a type of resource allocation for the sidelink communication. The first wireless device may perform the sidelink activity within the DRX ON duration without expanding the DRX ON duration if the first wireless device operates based on a mode 2 sidelink resource allocation, and the first wireless device may expand the DRX ON duration based on a DRX inactivity timer if the first wireless device operates based on a mode 1 sidelink resource allocation from a base station.

In some examples, the UE may postpone a retransmission until a next DRX ON duration if the retransmission would extend beyond the DRX ON duration. The first wireless device may receive, from a base station, a DRX configuration for an access link, where the first DRX pattern for sidelink is a same pattern as a second DRX pattern for the access link; and may extend the DRX ON duration for the access link and using a non-extended DRX ON duration for the sidelink.

The first wireless device may receive, from a base station, a DRX configuration for an access link, where the first DRX pattern for sidelink is different than a second DRX pattern for the access link; and may extend an ON duration of the second DRX pattern for the access link.

In some examples, the first wireless device may apply a DRX configuration based on a resource allocation mode of the first wireless device. For example, the first wireless device may apply the DRX configuration for a mode 1 resource allocation from a base station for the sidelink communication. For example, the first wireless device may not apply the DRX configuration for a full sensing mode or a partial sensing mode.

Figures 18A, 18B:
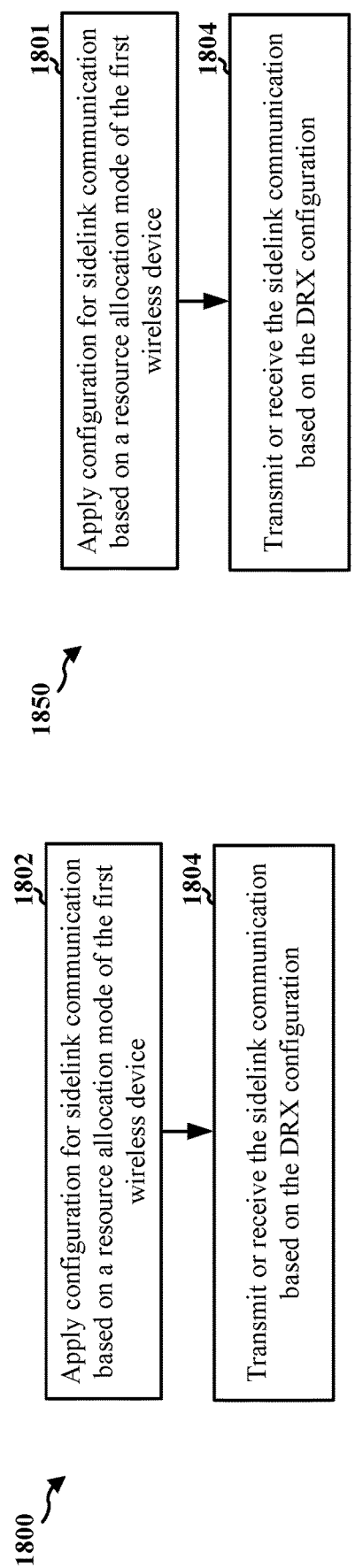
FIG. 18A is a flowchart of a method of wireless communication with a device using DRX for sidelink.
FIG. 18B is a flowchart of a method of wireless communication with a device using DRX for sidelink.

FIG. 18A is a flowchart 1800 of a method of wireless communication. The method may be performed by a first wireless device communicating based on sidelink (e.g., the UE 104, 402, 404, 406, 408, 1104, the device 310 or 350, the RSU 407; the apparatus 1402). A method may include any combination, or subcombination, of the aspects described in connection with FIG. 18A. The method may enable a wireless device to achieve power savings through DRX in connection with sidelink communication.

At 1802, the device receives, from a base station, a resource allocation for sidelink communication based on a mode 1 resource allocation. The reception may be performed, e.g., by the reception component 1430 of the apparatus 1402 in FIG. 14. Thus, the device may be operating, e.g., transmitting sidelink communication, based on a mode 1 resource allocation.

At 1804, the device transmits or receives the sidelink communication within the DRX ON duration of a DRX configuration and based on the mode 1 resource allocation mode. The mode 1 resource allocation may include a centralized resource allocation. For example, the device may operate in DRX based on mode 1 resource allocation and may skip DRX operation, and may continuously monitor for communication, if the device operates based on mode 2 resource allocation. The mode 2 resource allocation may be a decentralized mode in which each UE selects its own resource for sidelink transmission. The transmission or reception of the sidelink communication may include any of the aspects described in connection with the flowcharts in FIGS. 12, 13, 15, and/or 17. The transmission or reception may be performed, e.g., by the transmission component 1434 or the reception component 1430 in connection with the DRX component 1442.

FIG. 18B is a flowchart 1850 of a method of wireless communication. The method may be performed by a first wireless device communicating based on sidelink (e.g., the UE 104, 402, 404, 406, 408, 1104, the device 310 or 350, the RSU 407; the apparatus 1402). Aspects of the method in the flowchart 1850 may be performed in connection with the method in FIG. 18A, in some examples. At 1801, the device applies a DRX configuration for sidelink communication based on a resource allocation mode of the first wireless device. The application of the DRX configuration may be performed, e.g., by the DRX component 1442. For example, the device may determine whether or not to apply a DRX configuration based on a type of resource allocation that the device employs for the sidelink communication. For example, the device may apply the DRX configuration for a mode 1 resource allocation from a base station for the sidelink communication. The device may skip application of the DRX configuration in response to operation in a full sensing mode or a partial sensing mode of resource allocation.

At 1804, as in FIG. 18A, the device transmits or receives the sidelink communication based on the DRX configuration. For example, the device may transmit or receive the sidelink communication within a DRX ON duration. The transmission or reception of the sidelink communication may include any of the aspects described in connection with the flowcharts in FIGS. 12, 13, 15, and/or 17. The transmission or reception may be performed, e.g., by the transmission component 1434 or the reception component 1430 in connection with the DRX component 1442.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and aspects thereof may be combined with aspects of other examples or teaching described herein, without limitation.

Aspect 1 is a method of wireless communication at a first wireless device, comprising: transmitting a sidelink discovery message including information about a first discontinuous reception (DRX) pattern of the first wireless device; and monitoring for sidelink communication based on the first DRX pattern.

In aspect 2, the method of aspect 1 further includes that the sidelink discovery message comprises a sidelink announcement message, and transmitting the sidelink discovery message includes broadcasting the sidelink announcement including the information about the first DRX pattern of the first wireless device.

In aspect 3, the method of aspect 1 or aspect 2 further includes receiving a reply to the sidelink announcement message from a second wireless device, the reply including DRX information about a second DRX pattern of the second wireless device.

In aspect 4, the method of any of aspects 1-3 further includes communicating with the second wireless device over sidelink based on resources that are common to the first DRX pattern and the second DRX pattern.

In aspect 5, the method of any of aspects 1-4 further includes receiving a sidelink connection request from a second wireless device, wherein the first wireless device transmits the sidelink discovery message as response to the sidelink connection request from the second wireless device.

In aspect 6, the method of any of aspects 1-5 further includes receiving a reply to the sidelink discovery message from the second wireless device, the reply including DRX information about a second DRX pattern of the second wireless device.

In aspect 7, the method of any of aspects 1-6 further includes communicating with the second wireless device over sidelink based on resources that are common to the first DRX pattern and the second DRX pattern.

Aspect 8 is a device including one or more processors and one or more memories in electronic communication with the one or more processors storing instructions executable by the one or more processors to cause the device to implement a method as in any of aspects 1-7.

Aspect 9 is a system or apparatus including means for implementing a method or realizing an apparatus as in any of aspects 1-7.

Aspect 10 is a non-transitory computer readable medium storing instructions executable by one or more processors to cause the one or more processors to implement a method as in any of aspects 1-7.

Aspect 11 is a method of wireless communication, at a first wireless device, comprising: determining a discontinuous reception (DRX) pattern for sidelink communication; and performing sidelink activity within a DRX ON duration of the DRX pattern.

In aspect 12, the method of aspect 11 further includes that the sidelink activity performed by the first wireless device during the DRX ON duration includes one or more of sidelink transmission, sidelink reception, or sidelink sensing, and wherein the first wireless device skips performing the sidelink activity during a DRX OFF duration of the first DRX pattern.

In aspect 13, the method of aspect 11 or aspect 12 further includes that the sidelink activity performed by the first wireless device during the DRX ON duration and skipped during a DRX OFF duration includes sidelink transmission, sidelink reception, and sidelink sensing.

In aspect 14, the method of any one of aspects 11-13 further includes that the sidelink activity performed by the first wireless device during the DRX ON duration and skipped during a DRX OFF duration includes determining resources for a sidelink transmission to a second wireless device, the resources being within a DRX ON portion of the DRX.

In aspect 15, the method of any one of aspects 11-14 further includes transmitting, during the DRX ON duration, a message to the second wireless device reserving the resources; and refraining from sending the message reserving the resources outside the DRX ON duration.

In aspect 16, the method of any one of aspects 11-15 further includes that the resources reserved in the message are inside a same DRX ON duration in which the first wireless device transmits the message.

In aspect 17, the method of any one of aspects 11-16 further includes that the resources reserved in the message are inside a next DRX ON duration.

In aspect 18, the method of any one of aspects 11-17 further includes that the first wireless device reserves the resources based on the resources being within a first DRX ON duration of the first wireless device and a second DRX ON duration of the second wireless device.

In aspect 19, the method of any one of aspects 11-18 further includes that the first wireless device performs the sidelink activity within the DRX ON duration without expanding the DRX ON duration.

In aspect 20, the method of any one of aspects 11-19 further includes that the first wireless device performs the sidelink activity within the DRX ON duration without expanding the DRX ON duration based on a type of resource allocation for the sidelink communication.

In aspect 21, the method of any one of aspects 11-20 further includes that the first wireless device performs the sidelink activity within the DRX ON duration without expanding the DRX ON duration if the first wireless device operates based on a mode 2 sidelink resource allocation.

In aspect 22, the method of any one of aspects 11-20 further includes that the first wireless device expands the DRX ON duration based on a DRX inactivity timer if the first wireless device operates based on a mode 1 sidelink resource allocation from a base station.

In aspect 23, the method of any one of aspects 11-22 further includes postponing a retransmission until a next DRX ON duration if the retransmission would extend beyond the DRX ON duration.

In aspect 24, the method of any one of aspects 11-23 further includes receiving, from a base station, a DRX configuration for an access link, wherein a first DRX pattern for sidelink is the same as a second DRX pattern for the access link; and extending the DRX ON duration for the access link and using a non-extended DRX ON duration for the sidelink.

In aspect 25, the method of any one of aspects 11-23 further includes receiving, from a base station, a DRX configuration for an access link, wherein a first DRX pattern for sidelink is different than a second DRX pattern for the access link; and extending an ON duration of the second DRX pattern for the access link.

In aspect 26, the method of any one of aspects 11-25 further includes that the first wireless device applies a DRX configuration based on a resource allocation mode of the first wireless device.

In aspect 27, the method of any one of aspects 11-26 further includes that the first wireless device applies the DRX configuration for a mode 1 resource allocation from a base station for the sidelink communication.

In aspect 28, the method of any one of aspects 11-27 further includes that the first wireless device does not apply the DRX configuration for a full sensing mode or a partial sensing mode.

Aspect 29 is a device including one or more processors and one or more memories in electronic communication with the one or more processors storing instructions executable by the one or more processors to cause the device to implement a method as in any of aspects 9-28.

Aspect 30 is a system or apparatus including means for implementing a method or realizing an apparatus as in any of aspects 9-28.

Aspect 31 is a non-transitory computer readable medium storing instructions executable by one or more processors to cause the one or more processors to implement a method as in any of aspects 9-28.

Aspect 32 is a method of wireless communication with a first wireless device at a second wireless device, comprising: receiving a sidelink discovery message from the first wireless device including information about a first discontinuous reception (DRX) pattern of the first wireless device; and exchanging sidelink communication with the first wireless device based on the first DRX pattern.

In aspect 33, the method of aspect 32 further includes that the sidelink discovery message comprises a broadcast sidelink announcement message.

In aspect 34, the method of aspect 32 or aspect 33 further includes transmitting a reply to the broadcast sidelink announcement message from the first wireless device, the reply including DRX information about a second DRX pattern of the second wireless device.

In aspect 35, the method of any of aspects 32-34 further includes communicating with the first wireless device over sidelink based on resources that are common to the first DRX pattern and the second DRX pattern.

In aspect 36, the method of any of aspects 32-35 further includes transmitting a sidelink connection request to the first wireless device, wherein the second wireless device receives the sidelink discovery message as response to the sidelink connection request.

In aspect 37, the method of any of aspects 32-33 further includes transmitting a reply to the sidelink discovery message, the reply including DRX information about a second DRX pattern of the second wireless device.

In aspect 38, the method of any of aspects 32-37 further includes communicating with the first wireless device over sidelink based on resources that are common to the first DRX pattern and the second DRX pattern.

Aspect 39 is a device including one or more processors and one or more memories in electronic communication with the one or more processors storing instructions executable by the one or more processors to cause the device to implement a method as in any of aspects 32-38.

Aspect 40 is a system or apparatus including means for implementing a method or realizing an apparatus as in any of aspects 32-38.

Aspect 41 is a non-transitory computer readable medium storing instructions executable by one or more processors to cause the one or more processors to implement a method as in any of aspects 32-38.

Aspect 42 is a method of wireless communication at a first wireless device, comprising: determining a resource for sidelink communication within a DRX ON duration of a DRX pattern, and communicating on the resource within the DRX ON duration of the DRX pattern.

In aspect 43, the method of aspect 42 further includes performing one or more of sidelink transmission, sidelink reception, or sidelink sensing during the DRX ON duration and skipping performing the one or more of the sidelink transmission, the sidelink reception, or the sidelink sensing during a DRX OFF duration of the DRX pattern.

In aspect 44, the method of aspect 43 further includes performing the memory and the at least one processor are configured to perform the sidelink reception during the DRX ON duration and skip the sidelink reception during a DRX OFF duration.

In aspect 45, the method of aspect 43 or 44 further includes performing the sidelink sensing during the DRX ON duration and skip the sidelink sensing during a DRX OFF duration.

In aspect 46, the method of any of aspects 43-45 further includes performing transmitting, during the DRX ON duration, a message to a second wireless device reserving the resources that occur during the DRX ON duration; and refraining from reserving resources outside of the DRX ON duration.

In aspect 47, the method of aspect 46 further includes transmitting the message inside a same DRX ON duration in which the resource is reserved.

In aspect 48, the method of aspect 46 further includes transmitting the message inside a prior DRX duration than the DRX ON duration in which the resource is reserved.

In aspect 49, the method of any of aspects 46-48 further includes reserving the resource based on the resource being within a first DRX ON duration of the first wireless device and a second DRX ON duration of a second wireless device.

In aspect 50, the method of any of aspects 42-49 further includes performing one or more of sidelink transmission, sidelink reception, or sidelink sensing within the DRX ON duration without expanding the DRX ON duration.

In aspect 51, the method of any of aspects 42-50 further includes performing one or more of the sidelink transmission, the sidelink reception, or the sidelink sensing within the DRX ON duration without expanding the DRX ON duration based on a type of resource allocation for the sidelink communication.

In aspect 52, the method of aspect 51 further includes that the type of the resource allocation corresponds to a mode 2 sidelink resource allocation.

In aspect 53, the method of aspect 51 or 52 further includes expanding the DRX ON duration based on a DRX inactivity timer if the first wireless device operates based on a mode 1 sidelink resource allocation from a base station.

In aspect 54, the method of any of aspects 42-53 further includes postponing a retransmission until a next DRX ON duration if the retransmission would extend beyond the DRX ON duration.

In aspect 55, the method of any of aspects 42-54 further includes receiving, from a base station, a DRX configuration for an access link, wherein a first DRX pattern for sidelink is a same pattern as a second DRX pattern for the access link; and extending the DRX ON duration for the access link and using a non-extended DRX ON duration for the sidelink.

In aspect 56, the method of any of aspects 42-54 further includes receiving, from a base station, a DRX configuration for an access link, wherein a first DRX pattern for sidelink is different than a second DRX pattern for the access link; and extending an ON duration of the second DRX pattern for the access link.

Aspect 57 is an apparatus for wireless communication comprising means for performing the method of any of aspects 42-56.

In aspect 58, the apparatus of aspect 57 further includes at least one antenna and a transceiver coupled to the at least one antenna.

Aspect 59 is an apparatus for wireless communication comprising memory and at least one processor coupled to the memory, the memory and the at least one processor configured to perform the method of any of aspects 42-56.

In aspect 60, the apparatus of aspect 59 further includes at least one antenna and a transceiver coupled to the at least one antenna and the at least one processor.

Aspect 61 is a non-transitory computer-readable storage medium storing computer executable code for wireless communication at a first wireless device, the code when executed by a processor cause the processor to perform the method of any of aspects 42-56.

Aspect 62 is a method of wireless communication at a wireless device, the method comprising: receiving, from a base station, a resource allocation for sidelink communication based on a mode 1 resource allocation; and transmitting or receiving the sidelink communication within a DRX ON duration of a DRX configuration and based on the mode 1 resource allocation mode.

In aspect 63, the method of aspect 62 further includes applying the DRX configuration for the mode 1 resource allocation from a base station for the sidelink communication.

In aspect 64, the method of aspect 62 or 63 further includes skipping application of the DRX configuration in response to operation in a full sensing mode or a partial sensing mode of resource allocation.

Aspect 65 is an apparatus for wireless communication comprising means for performing the method of any of aspects 62-64.

In aspect 66, the apparatus of aspect 65 further includes at least one antenna and a transceiver coupled to the at least one antenna.

Aspect 67 is an apparatus for wireless communication comprising memory and at least one processor coupled to the memory, the memory and the at least one processor configured to perform the method of any of aspects 62-64.

In aspect 68, the apparatus of aspect 67 further includes at least one antenna and a transceiver coupled to the at least one antenna and the at least one processor.

Aspect 69 is a non-transitory computer-readable storage medium storing computer executable code for wireless communication at a first wireless device, the code when executed by a processor cause the processor to perform the method of any of aspects 62-64.

What is claimed is:

1. An apparatus for wireless communication at a first wireless device, comprising:
 one or more memories; and
 one or more processors coupled to the one or more memories, wherein the one or more processors are configured to cause the first wireless device to:
  determine a resource for sidelink communication within a discontinuous reception (DRX) ON duration of a DRX for a second wireless device;
  transmit a message to the second wireless device to reserve the resource that occurs only within the DRX ON duration of the second wireless device; and
  transmit a sidelink transmission to the second wireless device on the resource within the DRX ON duration of the DRX.

2. The apparatus of claim 1, wherein the one or more processors are further configured to cause the first wireless device to perform one or more of the sidelink transmission or sidelink reception during the DRX ON duration.

3. The apparatus of claim 2, wherein the one or more processors are configured to cause the first wireless device to perform the sidelink reception during the DRX ON duration.

4. The apparatus of claim 3, wherein the one or more processors are configured to cause the first wireless device to skip the sidelink reception during a DRX OFF duration.

5. The apparatus of claim 2, wherein the one or more processors are configured to cause the first wireless device to perform the sidelink transmission during the DRX ON duration.

6. The apparatus of claim 4, further comprising:
 at least one antenna; and
 a transceiver coupled to the at least one antenna and the one or more processors, wherein the one or more processors are configured to cause the first wireless device to skip the sidelink transmission during a DRX OFF duration.

7. The apparatus of claim 2, wherein the one or more processors are further configured to cause the first wireless device to perform sidelink sensing during the DRX ON duration and skip the sidelink sensing during a DRX OFF duration.

8. The apparatus of claim 1, wherein the one or more processors are configured to cause the first wireless device to:
 refrain from reservation of resources outside the DRX ON duration for the sidelink transmission to the second wireless device.

9. The apparatus of claim 8, wherein the one or more processors are configured to cause the first wireless device to transmit the message inside a same DRX ON duration in which the resource is reserved for the sidelink transmission.

10. The apparatus of claim 8, wherein the one or more processors are configured to cause the first wireless device to transmit the message inside a previous DRX ON duration than the DRX ON duration in which the resource is reserved for the sidelink transmission.

11. The apparatus of claim 8, wherein the one or more processors are further configured to cause the first wireless device to:
 reserve the resource based on the resource that is within a first DRX ON duration of the first wireless device and a second DRX ON duration of the second wireless device.

12. The apparatus of claim 1, wherein the one or more processors are further configured to cause the first wireless device to:
 perform one or more of the sidelink transmission, sidelink reception, or sidelink sensing within the DRX ON duration without an expansion of the DRX ON duration.

13. The apparatus of claim 12, wherein the one or more processors are further configured to cause the first wireless device to:
 perform one or more of the sidelink transmission, the sidelink reception, or the sidelink sensing within the DRX ON duration without the expansion of the DRX ON duration based on a type of resource allocation for the sidelink communication.

14. The apparatus of claim 13, wherein the type of the resource allocation corresponds to a mode 2 sidelink resource allocation.

15. The apparatus of claim 14, wherein the one or more processors are further configured to cause the first wireless device to:
 expand the DRX ON duration based on a DRX inactivity timer if the first wireless device operates based on a mode 1 sidelink resource allocation from a network node.

16. The apparatus of claim 1, wherein the one or more processors are further configured to cause the first wireless device to:
 postpone a retransmission until a next DRX ON duration if the retransmission would extend beyond the DRX ON duration.

17. The apparatus of claim 1, wherein the one or more processors are further configured to cause the first wireless device to:
 receive, from a network node, a DRX configuration for an access link, wherein a first DRX pattern for sidelink is a same pattern as a second DRX pattern for the access link;
 extend the DRX ON duration for the access link; and
 use a non-extended DRX ON duration for the sidelink.

18. The apparatus of claim 1, wherein the one or more processors are further configured to cause the first wireless device to:
 receive, from a network node, a DRX configuration for an access link, wherein a first DRX pattern for sidelink is different than a second DRX pattern for the access link; and
 extend an ON duration of the second DRX pattern for the access link.

19. The apparatus of claim 1, wherein the one or more processors are individually or collectively configured to cause the first wireless device to determine the resource for the sidelink communication within the DRX ON duration, transmit the message to the second wireless device to reserve the resource, and transmit the sidelink transmission to the second wireless device.

20. The apparatus of claim 1, wherein the sidelink transmission to the second wireless device on the resource is within the DRX ON duration of a DRX pattern of the second wireless device.

21. The apparatus of claim 1, wherein the sidelink transmission to the second wireless device on the resource is within the DRX ON duration of a DRX cycle of the second wireless device.

22. An apparatus for wireless communication at a first wireless device, comprising:
one or more memories; and
one or more processors coupled to the one or more memories, wherein the one or more processors are configured to cause the first wireless device to:
transmit a sidelink discovery message that includes information about a first discontinuous reception (DRX) of the first wireless device;
receive a message from a second wireless device with a resource reservation for a resource that occurs only within a DRX ON duration of the first wireless device; and
receive sidelink communication on the resource within the DRX ON duration of the first DRX.

23. The apparatus of claim 22, further comprising:
at least one antenna; and
a transceiver coupled to the at least one antenna and the one or more processors,
wherein the sidelink discovery message comprises a sidelink announcement message, and to transmit the sidelink announcement message, the one or more processors are further configured to cause the first wireless device to broadcast the sidelink announcement message that includes the information about the first DRX of the first wireless device.

24. The apparatus of claim 23, wherein the one or more processors are further configured to cause the first wireless device to:
receive a reply to the sidelink announcement message from the second wireless device, wherein the reply includes DRX information about a second DRX of the second wireless device.

25. The apparatus of claim 24, wherein the one or more processors are further configured to cause the first wireless device to:
communicate with the second wireless device over sidelink based on resources that are common to the first DRX and the second DRX.

26. The apparatus of claim 22, wherein the one or more processors are further configured to cause the first wireless device to:
receive a sidelink connection request from the second wireless device, wherein the one or more processors are configured to cause the first wireless device to transmit the sidelink discovery message as response to the sidelink connection request from the second wireless device.

27. The apparatus of claim 26, wherein the one or more processors are further configured to cause the first wireless device to:
receive a reply to the sidelink discovery message from the second wireless device, wherein the reply includes DRX information about a second DRX of the second wireless device.

28. The apparatus of claim 27, wherein the one or more processors are further configured to cause the first wireless device to:
communicate with the second wireless device over sidelink based on resources that are common to the first DRX and the second DRX.

29. The apparatus of claim 22, wherein the one or more processors are individually or collectively configured to cause the first wireless device to transmit the sidelink discovery message, receive the message from the second wireless device, and receive the sidelink communication.

30. The apparatus of claim 22, wherein the sidelink communication on the resource is within the DRX ON duration of a first DRX pattern of the first wireless device.

31. The apparatus of claim 22, wherein the sidelink communication on the resource is within the DRX ON duration of a first DRX cycle of the first wireless device.

32. An apparatus for wireless communication with a first wireless device at a second wireless device, comprising:
one or more memories; and
one or more processors coupled to the one or more memories, wherein the one or more processors are configured to cause the second wireless device to:
receive a sidelink discovery message from the first wireless device that includes information about a first discontinuous reception (DRX) of the first wireless device;
transmit a message to the first wireless device to reserve a resource that occurs only within a DRX ON duration of the first wireless device; and
transmit sidelink communication to the first wireless device within the DRX ON duration of the first DRX.

33. The apparatus of claim 32, wherein the sidelink discovery message comprises a broadcast sidelink announcement message, and the one or more processors are further configured to cause the second wireless device to:
transmit a reply to the broadcast sidelink announcement message from the first wireless device, wherein the reply includes DRX information about a second DRX of the second wireless device.

34. The apparatus of claim 33, further comprising:
at least one antenna; and
a transceiver coupled to the at least one antenna and the one or more processors, wherein the one or more processors are further configured to cause the second wireless device to:
communicate with the first wireless device over sidelink based on resources that are common to the first DRX and the second DRX.

35. The apparatus of claim 32, wherein the one or more processors are further configured to cause the second wireless device to:
transmit a sidelink connection request to the first wireless device prior to reception of the sidelink discovery message as response to the sidelink connection request; and
transmit a reply to the sidelink discovery message, wherein the reply includes DRX information about a second DRX of the second wireless device.

36. The apparatus of claim 35, wherein the one or more processors are further configured to cause the second wireless device to:
communicate with the first wireless device over sidelink based on resources that are common to the first DRX and the second DRX.

37. The apparatus of claim 32, wherein the one or more processors are individually or collectively configured to cause the second wireless device to receive the sidelink discovery message from the first wireless device, transmit the message to the first wireless device, and transmit the sidelink communication to the first wireless device within the DRX ON duration of the first DRX.

38. The apparatus of claim 32, wherein the sidelink communication is within the DRX ON duration of a first DRX pattern of the first wireless device.

39. The apparatus of claim 32, wherein the sidelink communication is within the DRX ON duration of a first DRX cycle of the first wireless device.

40. An apparatus for wireless communication at a wireless device, comprising:
one or more memories; and
one or more processors coupled to the one or more memories, wherein the one or more processors are configured to cause the wireless device to:
receive, from a network node, a resource allocation for sidelink communication based on a mode 1 resource allocation;
transmit or receive the sidelink communication within a discontinuous reception (DRX) ON duration of a DRX configuration and based on the mode 1 resource allocation;
apply the DRX configuration for the mode 1 resource allocation from the network node for the sidelink communication; and
skip application of the DRX configuration in response to an operation in a full sensing resource allocation mode or a partial sensing resource allocation mode.

41. The apparatus of claim 40, wherein the one or more processors are individually or collectively configured to cause the wireless device to receive the resource allocation for the sidelink communication based on the mode 1 resource allocation, transmit or receive the sidelink communication within the discontinuous reception (DRX) ON duration, apply the DRX configuration for the mode 1 resource allocation, and skip the application of the DRX configuration.

42. A method of wireless communication, at a first wireless device, comprising:
determining a resource for sidelink communication within a discontinuous reception (DRX) ON duration of a DRX for a second wireless device;
transmitting a message to the second wireless device reserving the resource that occurs only within the DRX ON duration of the second wireless device; and
transmitting a sidelink transmission to the second wireless device on the resource within the DRX ON duration of the DRX.

43. The method of claim 42, wherein the method further includes performing one or more of the sidelink transmission or sidelink reception.

44. The method of claim 43, wherein the method includes performing the sidelink transmission during the DRX ON duration.

45. The method of claim 44, further comprising skipping the sidelink transmission during a DRX OFF duration.

46. The method of claim 43, wherein the method includes performing the sidelink reception during the DRX ON duration.

47. The method of claim 46, further comprising skipping the sidelink reception during a DRX OFF duration.

48. The method of claim 43, wherein the method further includes:
performing sidelink sensing during the DRX ON duration and skipping the sidelink sensing during a DRX OFF duration.

49. The method of claim 42, further comprising:
refraining from reserving resources outside the DRX ON duration for the sidelink transmission to the second wireless device.

50. The method of claim 49, wherein transmitting the message includes transmitting the message inside a same DRX ON duration in which the resource is reserved for the sidelink transmission.

51. The method of claim 49, wherein transmitting the message includes transmitting the message inside a previous DRX ON duration than the DRX ON duration in which the resource is reserved for the sidelink transmission.

52. The method of claim 42, wherein the sidelink transmission to the second wireless device on the resource is within the DRX ON duration of a DRX pattern of the second wireless device.

53. The method of claim 42, wherein the sidelink transmission to the second wireless device on the resource is within the DRX ON duration of a DRX cycle of the second wireless device.

54. An apparatus for wireless communication at a first wireless device, comprising:
means for determining a resource for sidelink communication within a discontinuous reception (DRX) ON duration of a DRX for a second wireless device;
means for transmitting a message to the second wireless device reserving the resource that occurs only within the DRX ON duration of the second wireless device; and
means for transmitting a sidelink transmission to the second wireless device on the resource within the DRX ON duration of the DRX.

55. The apparatus of claim 54, wherein the apparatus further includes means for performing one or more of the sidelink transmission or sidelink reception.

56. The apparatus of claim 55, further comprising:
means for performing the sidelink transmission during the DRX ON duration.

57. The apparatus of claim 55, further comprising:
means for performing the sidelink reception during the DRX ON duration.

58. The apparatus of claim 54, further comprising:
means for refraining from reserving resources outside the DRX ON duration for the sidelink transmission to the second wireless device.

59. The apparatus of claim 54, wherein the sidelink transmission to the second wireless device on the resource is within the DRX ON duration of a DRX pattern of the second wireless device.

60. The apparatus of claim 54, wherein the sidelink transmission to the second wireless device on the resource is within the DRX ON duration of a DRX cycle of the second wireless device.

61. A non-transitory computer-readable storage medium storing computer executable code at a first wireless device, the code when executed by one or more processors causes the first wireless device to:
determine a resource for sidelink communication within a discontinuous reception (DRX) ON duration of a DRX for a second wireless device;
transmit a message to the second wireless device reserving the resource that occurs only within the DRX ON duration of the second wireless device; and
transmit a sidelink transmission to the second wireless device on the resource within the DRX ON duration of the DRX.

62. The non-transitory computer-readable storage medium of claim 61, wherein the code when executed by the one or more processors further causes the first wireless device to perform one or more of the sidelink transmission or sidelink reception.

63. The non-transitory computer-readable storage medium of claim 62, wherein the code when executed by the one or more processors causes the first wireless device to perform the sidelink transmission during the DRX ON duration.

64. The non-transitory computer-readable storage medium of claim 63, wherein the code when executed by the one or more processors further causes the first wireless device to:
skip the sidelink transmission during a DRX OFF duration.

65. The non-transitory computer-readable storage medium of claim 62, wherein the code when executed by the one or more processors causes the first wireless device to perform the sidelink reception during the DRX ON duration.

66. The non-transitory computer-readable storage medium of claim 65, wherein the code when executed by the one or more processors further causes the first wireless device to:
skip the sidelink reception during a DRX OFF duration.

67. The non-transitory computer-readable storage medium of claim 61, wherein the code when executed by the one or more processors further causes the first wireless device to:
refrain from reserving resources outside the DRX ON duration for the sidelink transmission to the second wireless device.

68. The non-transitory computer-readable storage medium of claim 61, wherein the sidelink transmission to the second wireless device on the resource is within the DRX ON duration of a DRX pattern of the second wireless device.

69. The non-transitory computer-readable storage medium of claim 61, wherein the sidelink transmission to the second wireless device on the resource is within the DRX ON duration of a DRX cycle of the second wireless device.

* * * * *